United States Patent
Qiao et al.

(10) Patent No.: US 11,240,639 B2
(45) Date of Patent: Feb. 1, 2022

(54) INFORMATION TRANSMISSION METHOD, NETWORK ELEMENT SELECTOR, AND CONTROLLER

(71) Applicant: HUAWEI TECHNOLOGIES CO., LTD., Shenzhen (CN)

(72) Inventors: Xiaoqiang Qiao, Shenzhen (CN); Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 16/441,014

(22) Filed: Jun. 14, 2019

(65) Prior Publication Data

US 2019/0297468 A1    Sep. 26, 2019

Related U.S. Application Data

(63) Continuation of application No. PCT/CN2016/110196, filed on Dec. 15, 2016.

(51) Int. Cl.
| | |
|---|---|
| *H04W 4/08* | (2009.01) |
| *H04W 8/18* | (2009.01) |
| *H04W 8/20* | (2009.01) |
| *H04W 28/08* | (2009.01) |
| *H04L 29/08* | (2006.01) |
| *H04W 88/14* | (2009.01) |

(52) U.S. Cl.
CPC ............. *H04W 4/08* (2013.01); *H04W 8/186* (2013.01); *H04W 8/20* (2013.01); *H04L 67/1023* (2013.01); *H04L 67/1036* (2013.01); *H04W 28/08* (2013.01); *H04W 88/14* (2013.01)

(58) Field of Classification Search
None
See application file for complete search history.

(56) References Cited

U.S. PATENT DOCUMENTS

| | | | | |
|---|---|---|---|---|
| 2008/0009307 A1* | 1/2008 | Sekhar | ............... | H04W 48/10 455/524 |
| 2009/0225663 A1* | 9/2009 | Kaiduka | ............ | H04L 41/5064 370/242 |

(Continued)

FOREIGN PATENT DOCUMENTS

| | | |
|---|---|---|
| CN | 102075871 A1 | 5/2011 |
| EP | 1357720 A1 | 10/2003 |

(Continued)

OTHER PUBLICATIONS

3GPP TS 23.003 V14.1.0 (Sep. 2016), 3rd Generation Partnership Project; Technical Specification Group Core Network and Terminals; Numbering, addressing and identification(Release 14), 103 pages.

*Primary Examiner* — Nicholas Sloms
(74) *Attorney, Agent, or Firm* — Hauptman Ham, LLP

(57) ABSTRACT

Embodiments of this application provide an information transmission method, a network element selector, and a controller. The information transmission method provided in the embodiments of this application includes: receiving, by an NES from an external network element, a first message including identification information of UE; determining, based on the identification information of the UE, a user group to which the UE belongs; determining a controller corresponding to the user group; and then sending the first message to the controller.

11 Claims, 17 Drawing Sheets

(56) References Cited

U.S. PATENT DOCUMENTS

| | | | |
|---|---|---|---|
| 2010/0281170 A1* | 11/2010 | Rui | H04L 12/1407 709/227 |
| 2011/0078112 A1* | 3/2011 | Takata | G06F 16/1748 707/622 |
| 2012/0315914 A1* | 12/2012 | Zhang | H04W 36/00835 455/439 |
| 2013/0337860 A1 | 12/2013 | Xu et al. | |
| 2014/0011527 A1 | 1/2014 | Xu et al. | |
| 2015/0327024 A1* | 11/2015 | Yang | H04W 48/20 370/312 |
| 2015/0358850 A1* | 12/2015 | La Roche, Jr. | H04L 45/38 370/328 |
| 2016/0119776 A1* | 4/2016 | Rasanen | H04L 67/22 455/405 |
| 2020/0404733 A1* | 12/2020 | Hu | H04W 36/12 |

FOREIGN PATENT DOCUMENTS

| | | |
|---|---|---|
| EP | 2790426 A1 | 10/2014 |
| EP | 3122112 A1 | 1/2017 |
| WO | 2009030135 A1 | 3/2009 |
| WO | 2012040398 A1 | 3/2012 |
| WO | 2014183776 A1 | 11/2014 |
| WO | 2015141228 A1 | 9/2015 |

\* cited by examiner

INFORMATION TRANSMISSION METHOD, NETWORK ELEMENT SELECTOR, AND CONTROLLER

CROSS-REFERENCE TO RELATED APPLICATIONS

This application is a continuation of International Patent Application No. PCT/CN2016/110196, filed on Dec. 15, 2016, the disclosure of which is hereby incorporated by reference in its entirety.

TECHNICAL FIELD

Embodiments of this application relate to communications technologies, and in particular, to an information transmission method, a network element selector, and a controller.

BACKGROUND

In a standard proposed by the 3rd Generation Partnership Project (3GPP), an evolved packet system may include a Long Term Evolution (LTE) access network part and a System Architecture Evolution (SAE) core network part. There are excessive control network elements in an SAE core network architecture, and status information is relatively distributed. As a result, there are excessive control interfaces and interaction signaling in the core network, and a control logic conflict easily occurs between the control interfaces and the interaction signaling. This reduces overall communication efficiency of a system. Therefore, the core network architecture needs to be further simplified through control function convergence and status information aggregation, to improve network efficiency.

In a core network architecture for control convergence, a network element selector needs to select a corresponding controller based on signaling sent by an external network element, to evenly allocate signaling load. Currently, the network element selector usually selects a corresponding controller for each user equipment (UE) on a per-UE basis, to perform signaling transmission.

However, due to a relatively large quantity of UEs in a network system, network load is relatively large and complexity of selecting a controller is relatively high when a controller is selected on a per-UE basis, and consequently, signaling processing efficiency of the system is relatively low.

SUMMARY

Embodiments of this application provide an information transmission method, a network element selector, and a controller to reduce complexity of selecting a controller, and improve signaling processing efficiency.

According to a first aspect, an embodiment of this application provides an information processing method, including:

receiving, by a network element selector NES from an external network element, a first message including identification information of UE;

determining, by the NES based on the identification information of the UE, a first user group to which the UE belongs;

determining, by the NES, a first controller corresponding to the first user group; and sending, by the NES, the first message to the first controller.

According to the information transmission method, the NES may be used to: receive the first message from the external network element, where the first message includes the identification information of the UE, determine, based on the identification information of the UE, the first user group to which the UE belongs, determine the first controller corresponding to the first user group, and then send the first message to the first controller, so that the first controller performs signaling processing based on the first message. In the method, the NES determines, based on the identification information of the UE, the first user group to which the UE belongs, and then determines the controller corresponding to the first user group. In other words, in the method, the NES may select a controller on a per-user group basis instead of a per-UE basis. Because a quantity of user groups is less than a quantity of UEs, information about a correspondence used to select a controller corresponding to a user group is reduced in the method, complexity of selecting a controller is reduced, and signaling processing efficiency is improved.

In a possible implementation, the determining, by the NES, a first controller corresponding to the first user group includes:

determining, by the NES based on the first user group and a preset correspondence between a user group and a controller, the first controller corresponding to the first user group.

In another possible implementation, the information transmission method may further include:

receiving, by the NES, a second message including an identifier of a second controller and a user group list corresponding to the second controller; and adding, by the NES, the identifier of the second controller and the user group list corresponding to the second controller to a preset correspondence between a user group and a controller.

In still another possible implementation, the receiving, by the NES, a second message may include:

receiving, by the NES, the second message from the second controller or an O&M device.

A plurality of information transmission methods in controller adding scenarios are provided in the information transmission method, to implement flexible scaling of controller resources in a manner of adding a controller to a network. In addition, the identifier of the second controller and the user group list corresponding to the second controller are added to the preset correspondence between a user group and a controller, so that the correspondence in the NES can adapt to the controller resources. Therefore, signaling load can be flexibly allocated, and service flexibility can be improved after the controller is added.

In still another possible implementation, the information transmission method may further include:

receiving, by the NES, a third message, where the third message includes an identifier of a second user group and an identifier of a controller corresponding to the second user group; and adding, by the NES, the identifier of the second user group and the identifier of the controller corresponding to the second user group to the preset correspondence between a user group and a controller.

In still another possible implementation, the receiving, by the NES, a third message may include:

receiving, by the NES, the third message from the controller corresponding to the second user group or an O&M device.

According to the information transmission method in a user group adding scenario provided above, a quantity of user groups corresponding to a controller can be flexibly changed in a manner of adding a user group to a network. In addition, an identifier of the added user group and a user group list corresponding to a controller corresponding to the added user group are added to a preset correspondence between a user group and a controller, so that signaling load can be flexibly allocated, and service flexibility can be improved.

In still another possible implementation, the foregoing information transmission method may further include:

receiving, by the NES, a fourth message, where the fourth message includes an identifier of a third controller and a user group list migrated from a fourth controller to the third controller; and adding, by the NES in the preset correspondence between a user group and a controller, the user group list migrated to the third controller to a user group corresponding to the third controller, and deleting the user group list migrated to the third controller from a user group corresponding to the fourth controller.

In still another possible implementation, the receiving, by the NES, a fourth message in the foregoing method may include:

receiving, by the NES, the fourth message from the third controller or an O&M device.

Load migration may be implemented by performing the information transmission method in a load migration scenario provided above, to implement load balancing between the third controller and the fourth controller.

In still another possible implementation, the information transmission method may further include:

receiving, by the NES, a fifth message, where the fifth message includes an identifier of a fifth controller and a user group list corresponding to the fifth controller; and deleting, by the NES, the identifier of the fifth controller and the user group list corresponding to the fifth controller from the preset correspondence between a user group and a controller.

In still another possible implementation, the receiving, by the NES, a fifth message in the foregoing method includes:

receiving, by the NES, the fifth message from the fifth controller or an O&M device.

According to the information transmission method in a controller deleting scenario provided above, flexible scaling of controller resources can be implemented in a manner of deleting a controller from a network. In addition, the identifier of the fifth controller and the user group list corresponding to the fifth controller are deleted from the preset correspondence between a user group and a controller, so that the correspondence in the NES can adapt to the controller resources. Therefore, signaling load can be flexibly allocated, and service flexibility can be improved after the controller is deleted.

In still another possible implementation, the information transmission method may further include:

receiving, by the NES, a sixth message, where the sixth message includes an identifier of a third user group and an identifier of a controller corresponding to the third user group; and deleting, by the NES, the identifier of the third user group and the identifier of the controller corresponding to the third user group from the preset correspondence between a user group and a controller.

In still another possible implementation, the receiving, by the NES, a sixth message in the foregoing method may include:

receiving, by the NES, the sixth message from the controller corresponding to the third user group or an O&M device.

According to the information transmission method in a user group deleting scenario provided above, a quantity of user groups corresponding to a controller can be flexibly changed in a manner of deleting a user group from a network. In addition, the identifier of the third user group and the user group list corresponding to the controller corresponding to the third user group are deleted from the preset correspondence between a user group and a controller, so that signaling load can be flexibly allocated, and service flexibility can be improved.

In still another possible implementation, an external network element includes any one of the following: user equipment UE, a base station, or a gateway user plane entity.

In still another possible implementation, identification information of the UE includes a temporary identifier of the UE and an identifier of a user group to which the UE belongs.

According to a second aspect, an embodiment of this application further provides an information processing method, including:

determining, by a controller, a first user group corresponding to user equipment UE, and allocating an identifier to the UE, where the identifier includes an identifier of the first user group and a temporary identifier of the UE; and sending, by the controller, the identifier to an external network element corresponding to the UE, where the identifier is used to determine a controller that receives a message of the UE.

In the information transmission method, the controller may determine the first user group corresponding to the UE, determine the identifier of the first user group and the temporary identifier of the UE for the UE, and send the identifier to the external network element corresponding to the UE, where the identifier is used to determine the controller that receives the message of the UE. In the foregoing method, the NES may determine, based on the identifier allocated by the controller to the UE, the controller corresponding to the user group to which the UE belongs. In other words, in the method, the NES may select a controller on a per-user group basis instead of a per-user basis, thereby reducing complexity of selecting the controller and improving signaling processing efficiency.

In a possible implementation, the determining, by a controller, a first user group corresponding to UE may include:

obtaining, by the controller, a first user group list; and selecting, by the controller from the first user group list, a user group as the first user group corresponding to the UE.

In another possible implementation, the obtaining, by the controller, a first user group list may include:

receiving, by the controller, the first user group list from an operation and maintenance O&M device.

In still another possible implementation, the obtaining, by the controller, a first user group list may include:

receiving, by the controller, an identifier of a second user group from an O&M device; and adding, by the controller, the identifier of the second user group to an existing second user group list, to obtain the first user group list.

In still another possible implementation, the obtaining, by the controller, a first user group list may include:

receiving, by the controller from an O&M device, a third user group list migrated from another controller to the controller; and obtaining, by the controller, the first user group list based on a user group corresponding to the third user group list and a user group corresponding to an existing fourth user group list, so that the first user group list includes the user group corresponding to the third user group list and the user group corresponding to the fourth user group list.

According to the information transmission methods provided in the second aspect, a UE identifier is allocated in information transmission methods in the controller adding scenario, the user group adding scenario, and the user group deleting scenario, to effectively ensure scalability of a network system, implement flexible scaling of the controller, and improve service flexibility. In addition, in the information transmission method, a UE identifier is allocated in the information transmission method in the load migration scenario, so that load balancing between controllers can be more flexibly implemented.

According to a third aspect, an embodiment of this application provides a network element selector, including:

a receiving module, configured to receive, from an external network element, a first message including identification information of UE;

a processing module, configured to: determine, based on the identification information of the UE, a first user group to which the UE belongs; and determine a first controller corresponding to the first user group; and a sending module, configured to send the first message to the first controller.

In a possible implementation, the processing module is specifically configured to determine, based on the first user group and a preset correspondence between a user group and a controller, the first controller corresponding to the first user group.

In another possible implementation, the receiving module is further configured to receive a second message including an identifier of a second controller and a user group list corresponding to the second controller; and the processing module is further configured to add the identifier of the second controller and the user group list corresponding to the second controller to the preset correspondence between a user group and a controller.

In still another possible implementation, the receiving module is specifically configured to receive the second message from the second controller or an O&M device.

In still another possible implementation, the receiving module is further configured to receive a third message, where the third message includes an identifier of a second user group and an identifier of a controller corresponding to the second user group; and the processing module is further configured to add the identifier of the second user group and the identifier of the controller corresponding to the second user group to the preset correspondence between a user group and a controller.

In still another possible implementation, the receiving module is specifically configured to receive the third message from the controller corresponding to the second user group or the O&M device.

In still another possible implementation, the receiving module is further configured to receive a fourth message, where the fourth message includes an identifier of a third controller and a user group list migrated from a fourth controller to the third controller; and the processing module is further configured to: add, in the preset correspondence between a user group and a controller, the user group list migrated to the third controller to a user group corresponding to the third controller, and delete the user group list migrated to the third controller from a user group corresponding to the fourth controller.

In still another possible implementation, the receiving module is specifically configured to receive the fourth message from the third controller or the O&M device.

In still another possible implementation, the receiving module is further configured to receive a fifth message, where the fifth message includes an identifier of a fifth controller and a user group list corresponding to the fifth controller; and the processing module is further configured to delete the identifier of the fifth controller and the user group list corresponding to the fifth controller from the preset correspondence between a user group and a controller.

In still another possible implementation, the receiving module is specifically configured to receive the fifth message from the fifth controller or the O&M device.

In still another possible implementation, the receiving module is further configured to receive a sixth message, where the sixth message includes an identifier of a third user group and an identifier of a controller corresponding to the third user group; and the processing module is further configured to delete the identifier of the third user group and the identifier of the controller corresponding to the third user group from the preset correspondence between a user group and a controller.

In still another possible implementation, the receiving module is specifically configured to receive the sixth message from the controller corresponding to the third user group or the O&M device.

In still another possible implementation, the external network element includes any one of the following: user equipment UE, a base station, or a gateway user plane entity.

In still another possible implementation, the identification information of the UE includes a temporary identifier of the UE and an identifier of the user group to which the UE belongs.

According to a fourth aspect, an embodiment of this application further provides a controller, including:

a processing module, configured to: determine a first user group corresponding to user equipment UE, and allocate an identifier to the UE, where the identifier includes an identifier of the first user group and a temporary identifier of the UE; and a sending module, configured to send the identifier to an external network element corresponding to the UE, where the identifier is used to determine a controller that receives a message of the UE.

In a possible implementation, the processing module is specifically configured to: obtain a first user group list; and select, from the first user group list, a user group as the first user group corresponding to the UE.

In another possible implementation, the controller further includes:

a receiving module, configured to receive the first user group list from an operation and maintenance O&M device.

In still another possible implementation, the controller further includes:

a receiving module, configured to receive an identifier of a second user group from an O&M device; and the processing module is specifically configured to add the identifier of the second user group to an existing second user group list, to obtain the first user group list.

In still another possible implementation, the controller further includes:

a receiving module, configured to receive, from an O&M device, a third user group list migrated from another controller to the controller; and the processing module is specifically configured to obtain the first user group list based on a user group corresponding to the third user group list and a user group corresponding to an existing fourth user group list, so that the first user group list includes the user group corresponding to the third user group list and the user group corresponding to the fourth user group list.

According to a fifth aspect, an embodiment of this application provides a network element selector NES, including: a receiver, a processor, and a transmitter, where the receiver is connected to the processor, and the processor is further connected to the transmitter.

The receiver is configured to receive, from an external network element, a first message including identification information of UE.

The processor is configured to: determine, based on the identification information of the UE, a first user group to which the UE belongs; and determine a first controller corresponding to the first user group.

The transmitter is configured to send the first message to the first controller.

In a possible implementation, the processor is specifically configured to determine, based on the first user group and a preset correspondence between a user group and a controller, the first controller corresponding to the first user group.

In another possible implementation, the receiver is further configured to receive a second message including an identifier of a second controller and a user group list corresponding to the second controller; and the processor is further configured to add the identifier of the second controller and the user group list corresponding to the second controller to the preset correspondence between a user group and a controller.

In still another possible implementation, the receiver is specifically configured to receive the second message from the second controller or an O&M device.

In still another possible implementation, the receiver is further configured to receive a third message, where the third message includes an identifier of a second user group and an identifier of a controller corresponding to the second user group; and the processor is further configured to add the identifier of the second user group and the identifier of the controller corresponding to the second user group to the preset correspondence between a user group and a controller.

In still another possible implementation, the receiver is specifically configured to receive the third message from the controller corresponding to the second user group or the O&M device.

In still another possible implementation, the receiver is further configured to receive a fourth message, where the fourth message includes an identifier of a third controller and a user group list migrated from a fourth controller to the third controller; and the processor is further configured to: add, in the preset correspondence between a user group and a controller, the user group list migrated to the third controller to a user group corresponding to the third controller, and delete the user group list migrated to the third controller from a user group corresponding to the fourth controller.

In still another possible implementation, the receiver is specifically configured to receive the fourth message from the third controller or the O&M device.

In still another possible implementation, the receiver is further configured to receive a fifth message, where the fifth message includes an identifier of a fifth controller and a user group list corresponding to the fifth controller; and the processor is further configured to delete the identifier of the fifth controller and the user group list corresponding to the fifth controller from the preset correspondence between a user group and a controller.

In still another possible implementation, the receiver is specifically configured to receive the fifth message from the fifth controller or the O&M device.

In still another possible implementation, the receiver is further configured to receive a sixth message, where the sixth message includes an identifier of a third user group and an identifier of a controller corresponding to the third user group; and the processor is further configured to delete the identifier of the third user group and the identifier of the controller corresponding to the third user group from the preset correspondence between a user group and a controller.

In still another possible implementation, the receiver is specifically configured to receive the sixth message from the controller corresponding to the third user group or the O&M device.

In still another possible implementation, the external network element includes any one of the following: user equipment UE, a base station, or a gateway user plane entity.

In still another possible implementation, the identification information of the UE includes a temporary identifier of the UE and an identifier of the user group to which the UE belongs.

According to a sixth aspect, an embodiment of this application further provides a controller, including: a processor and a transmitter, where the processor is connected to the transmitter.

The processor is configured to: determine a first user group corresponding to user equipment UE, and allocate an identifier to the UE, where the identifier includes an identifier of the first user group and a temporary identifier of the UE.

The transmitter is configured to send the identifier to an external network element corresponding to the UE, where the identifier is used to determine a controller that receives a message of the UE.

In a possible implementation, the processor is specifically configured to: obtain a first user group list; and select, from the first user group list, a user group as the first user group corresponding to the UE.

In another possible implementation, the controller further includes a receiver, and the receiver is connected to the processor; and the receiver is configured to receive the first user group list from an operation and maintenance O&M device.

In still another possible implementation, the controller further includes a receiver, and the receiver is connected to the processor.

The receiver is configured to receive an identifier of a second user group from an O&M device.

The processor is specifically configured to add the identifier of the second user group to an existing second user group list, to obtain the first user group list.

In still another possible implementation, the controller further includes a receiver, and the receiver is connected to the processor.

The receiver is configured to receive, from an O&M device, a third user group list migrated from another controller to the controller.

The processor is specifically configured to obtain the first user group list based on a user group corresponding to the third user group list and a user group corresponding to an existing fourth user group list, so that the first user group list includes the user group corresponding to the third user group list and the user group corresponding to the fourth user group list.

According to the information transmission method, the network element selector, and the controller provided in the embodiments of this application, the NES may be used to: receive the first message from the external network element, where the first message includes the identification information of the UE; determine, based on the identification information of the UE, the first user group to which the UE belongs; determine the first controller corresponding to the first user group; and then send the first message to the first controller, so that the first controller performs signaling processing based on the first message. In the method, the NES determines, based on the identification information of the UE, the user group to which the UE belongs, and then determines the controller corresponding to the user group to which the UE belongs. In other words, in the method, the NES may select a controller on a per-user group basis instead of a per-user basis. Therefore, complexity of selecting a controller is reduced, and signaling processing efficiency is improved.

DESCRIPTION OF DRAWINGS

To describe the technical solutions in the embodiments of this application more clearly, the following briefly describes the accompanying drawings required for describing the embodiments.

DESCRIPTION OF EMBODIMENTS

The following describes the embodiments of this application with reference to accompanying drawings. Information transmission methods provided in the following embodiments of this application are applicable to a control convergence-based core network architecture. The control convergence-based core network architecture may be a new core network architecture implemented by combining control functions in an SAE core network architecture in a 3G communications technology and/or a subsequent evolved communications technology, and aggregating service data.

Figure 1:
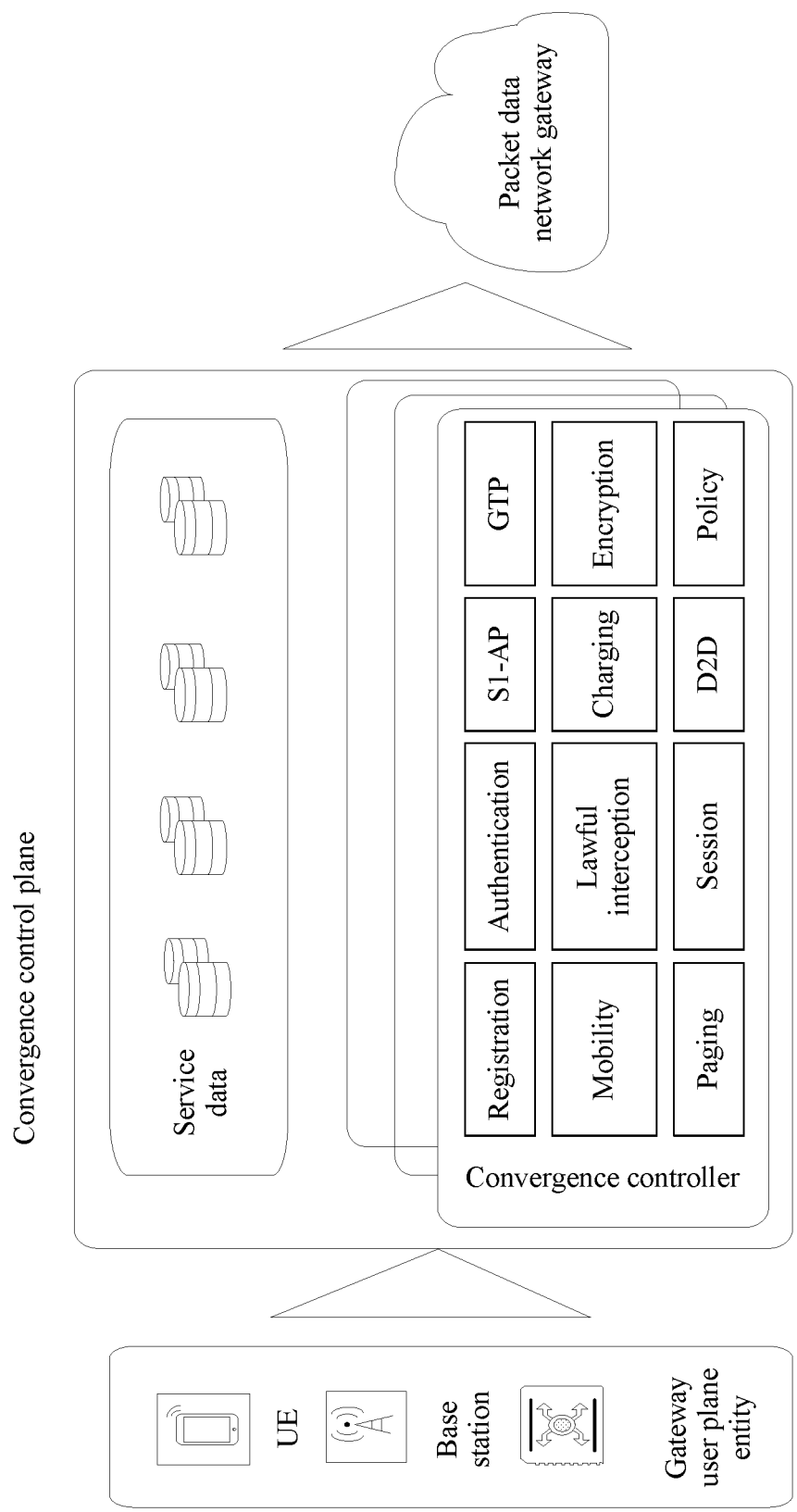
FIG. 1 is a schematic diagram of a control convergence-based core network architecture according to an embodiment of this application.

FIG. 1 is a schematic diagram of a control convergence-based core network architecture according to an embodiment of this application. As shown in FIG. 1, the control convergence-based core network architecture may include an external network element (External Network Element), a convergence control plane, and a packet data network gateway (P-GW). For example, the external network element may include user equipment (UE), a base station, or a gateway user-plane (GW-U) entity. For example, the UE may include a mobile phone, a tablet computer, an intelligent terminal, a multimedia device, and a streaming media device. For example, the base station may include a base transceiver station (BTS), a NodeB (Node Base, NodeB for short), and an evolved NodeB (eNB). The gateway user plane entity may integrate user plane functions of at least one type of gateway such as a serving gateway (SGW), an evolved packet data gateway (ePDG), a trusted access gateway (TGW), and an untrusted access gateway (UGW).

The convergence control plane includes a plurality of convergence controllers. Each convergence controller converges functions of existing core network control network elements (for example, at least two control network elements such as a mobility management entity, a gateway controller, and a policy and policy charging function network element), and can be used to implement registration management, authentication management, S1-AP protocol management, general packet radio service tunneling protocol (GTP) management, mobility management, lawful interception management, encryption, charging and policy management, paging management, session management, device-to-device (D2D) communication management, and the like, to reduce control interfaces and interaction signaling in a core network. Optionally, the convergence controller can further implement flexible scaling and dynamic deployment of the convergence controller by using a Network Functions Virtualization (NFV) technology, to improve resource utilization. In addition, each controller implements logical decoupling between service data and service control through function convergence, and performs storage management on the service data together, thereby improving system reliability and scalability, and increasing service flexibility.

Figure 2:
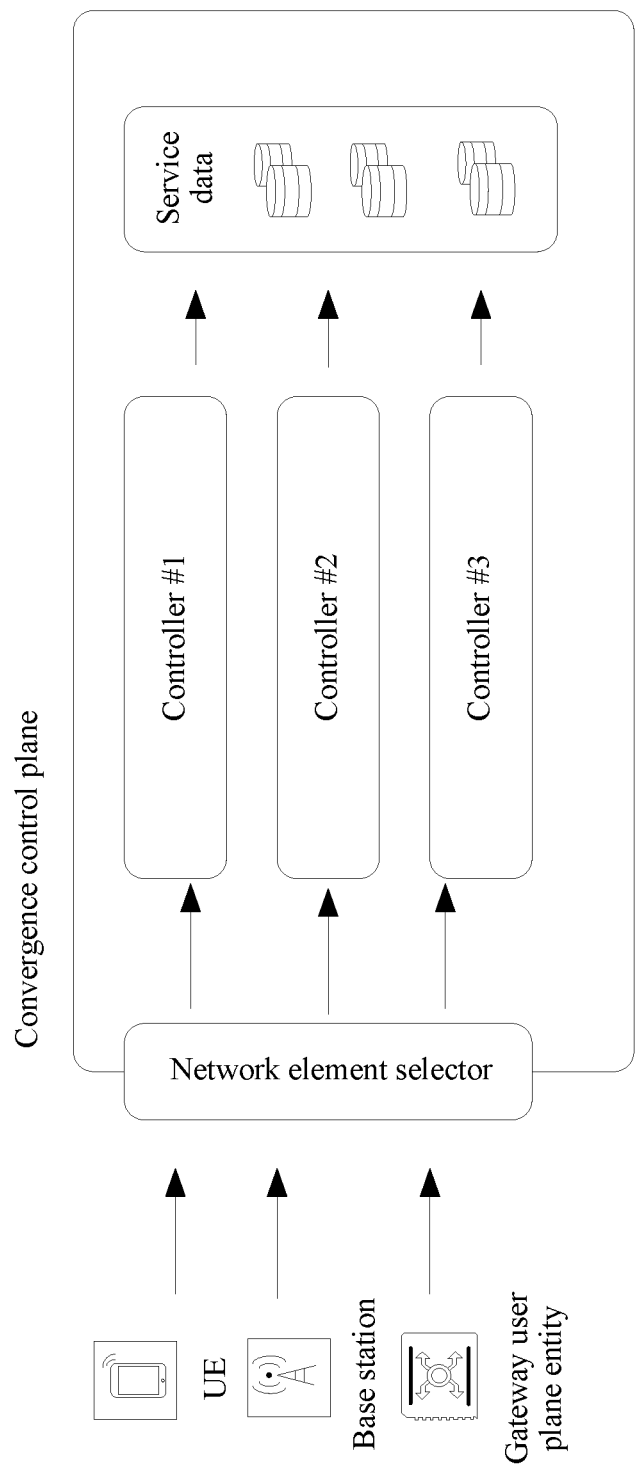
FIG. 2 is a schematic diagram of another control convergence-based core network architecture according to an embodiment of this application.

FIG. 2 is a schematic diagram of another control convergence-based core network architecture according to an embodiment of this application. As shown in FIG. 2, a network element selector (NES) is deployed in a convergence control plane of the control convergence-based core network architecture, to implement resource sharing, selection, and load balancing among a plurality of controllers in the control convergence-based core network architecture. The control convergence-based core network architecture may further include an external network element, and the external network element may be similar to that in FIG. 1. Details are not described herein again. The convergence control plane may include an NES and a plurality of controllers. The NES is responsible for receiving a message of UE from the external network element, selecting among the plurality of controllers, and forwarding the message of the UE to a corresponding controller, to evenly allocate signaling load.

In the method provided in the embodiments of the present disclosure, the NES may select a controller based on a user equipment group to which user equipment belongs. This can reduce complexity of controller selection and improve system signaling processing efficiency.

The following uses a plurality of specific examples for specific description.

Figure 3:
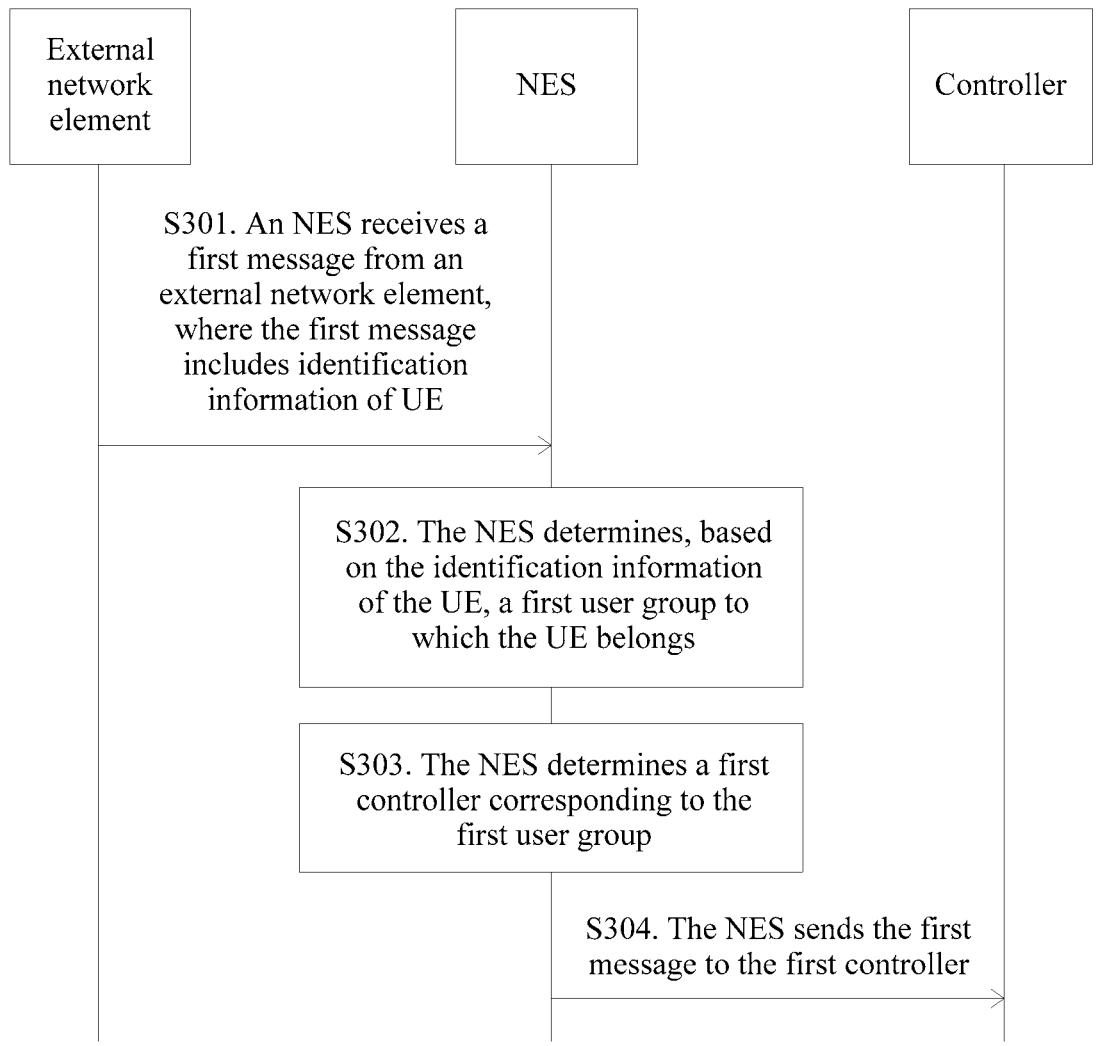
FIG. 3 is a flowchart of an information transmission method according to an embodiment of this application.

In an embodiment of the present disclosure, the present disclosure provides an information transmission method. FIG. 3 is a flowchart of an information transmission method according to an embodiment of the present disclosure. As shown in FIG. 3, the information transmission method may include the following steps.

S301. An NES receives a first message from an external network element, where the first message includes identification information of UE.

For example, the first message may include signaling of the UE. For example, the external network element may include any one of the following: UE, a base station, or a gateway user plane entity. For example, if the external network element is UE, the first message may be a message sent by the UE by using an SA-AP protocol; if the external network element is a base station, the first message may be a message sent by the base station by using a General Packet Radio Service Tunneling Protocol-Control Plane (GTP-C); or if the external network element is another network element such as a gateway user plane entity, the first message may be a message sent by the external network element by using a diameter (Diameter) protocol. The identification information of the UE may be used to identify a user group to which the UE belongs, and the identification information of the UE may be located in a user identification field of the message. Optionally, the identification information of the UE may include a temporary identifier of the UE and an identifier of the user group to which the UE belongs. Both the temporary identifier of the UE and the identifier of the user group to which the UE belongs are allocated by a controller corresponding to the user group to which the UE belongs.

S302. The NES determines, based on the identification information of the UE, a first user group to which the UE belongs.

For example, the NES may determine, based on the identification information of the UE, that a user group corresponding to the identification information of the UE is the first user group to which the UE belongs. Each user group may include at least one UE.

For example, if the identification information of the UE includes the temporary identifier of the UE, the NES may determine, based on the temporary identifier of the UE and a preset correspondence between a UE identifier and a user group, the first user group to which the UE belongs. If the identification information of the UE includes the identifier of the user group to which the UE belongs, the NES may directly determine the user group corresponding to the identifier of the user group as the first user group to which the UE belongs. The preset correspondence between a UE identifier and a user group may be stored in the NES in a form of a table or a database.

S303. The NES determines a first controller corresponding to the first user group.

For example, each controller is corresponding to one user group list, and the user group list may include at least one user group corresponding to the controller. User group identifiers corresponding to different user groups are different, and UEs included in the different user groups are different. The NES may search a user group list corresponding to each controller for the first user group. If a user group list corresponding to a controller includes the first user group, it may be determined that the controller is a controller corresponding to the first user group. Therefore, the NES selects a controller on a per-user group basis, and determines the controller corresponding to the user group to which the UE belongs.

It should be noted that a user group list corresponding to each controller may be a separate correspondence table; user group lists corresponding to different controllers may be located in one user group mapping table, and the user group mapping table may include user group lists corresponding to all controllers.

Optionally, in the foregoing information transmission method, that the NES determines the first controller corresponding to the first user group in S303 may include:

determining, by the NES based on the first user group and a preset correspondence between a user group and a controller, the first controller corresponding to the first user group.

For example, the preset correspondence between a user group and a controller may be represented by using a user group mapping table. The user group mapping table may include user group lists corresponding to all controllers, and a user group list corresponding to each controller may include at least one user group corresponding to the controller.

S304. The NES sends the first message to the first controller.

For example, after receiving the first message, the first controller may perform corresponding signaling processing based on the first message.

According to the information transmission method provided in this embodiment of the present disclosure, the NES may be used to: receive the first message from the external network element, where the first message includes the identification information of the UE; determine, based on the identification information of the UE, the first user group to which the UE belongs; determine the first controller corresponding to the first user group; and then send the first message to the first controller, so that the first controller performs signaling processing based on the first message. In the method, the NES determines, based on the identification information of the UE, the first user group to which the UE belongs, and then determines the controller corresponding to the first user group. In other words, in the method, the NES may select a controller on a per-user group basis instead of a per-UE basis. Because a quantity of user groups is less than a quantity of UEs, information about a correspondence used to select a controller corresponding to a user group is reduced in the method, complexity of selecting a controller is reduced, and signaling processing efficiency is improved.

Figure 4:
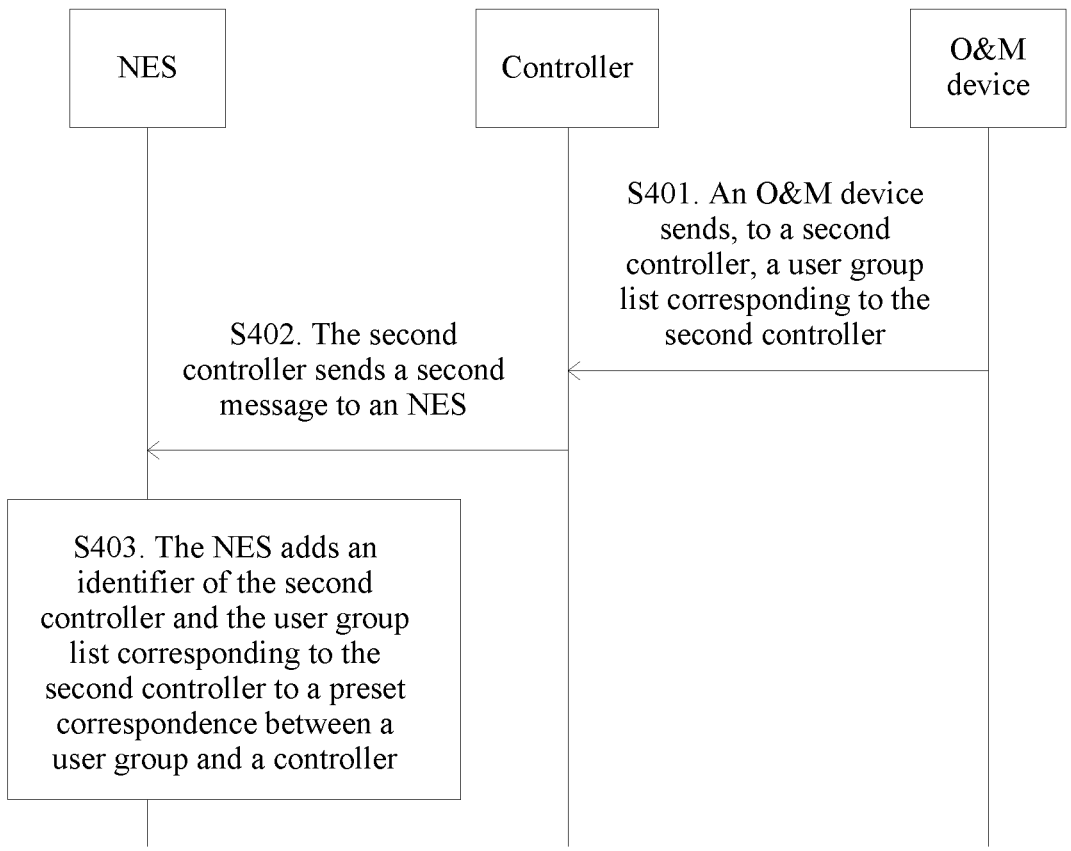
FIG. 4 is a flowchart of an information transmission method in a controller adding scenario according to an embodiment of this application.

Optionally, this application further provides an information transmission method. FIG. 4 is a flowchart of an information transmission method in a controller adding scenario according to an embodiment of this application. As shown in FIG. 4, the method may further include the following steps.

S401. An operation and maintenance (O&M) device sends, to a second controller, a user group list (Group ID List) corresponding to the second controller.

Correspondingly, the second controller receives, from the O&M device, the user group list corresponding to the second controller.

The second controller may be an added controller (Added Controller). When determining that a quantity of existing controllers is less than or equal to a preset value and a quantity of UEs is greater than or equal to a preset value, that is, the quantity of existing controllers is relatively small and currently the quantity of UEs is relatively large, the O&M device may determine that controller resources need to be extended, that is, a controller needs to be added. Therefore, the O&M device sends the user group list corresponding to the second controller to the second controller, so that the second controller sends a second message to an NES.

In other words, the user group list corresponding to the second controller may be configured by the O&M device. After receiving the user group list, the second controller may record the user group list, to allocate, based on the user group list, a user group identifier to each user group in the user group list, allocate a temporary identifier to UE in each user group, and the like.

S402. The second controller sends a second message to an NES.

The second message may be a message of the added controller, and the second message may include an identifier (New Controller ID) of the second controller and the user group list corresponding to the second controller. The identifier of the second controller may be an identifier preconfigured in the second controller.

Correspondingly, the NES receives the second message from the second controller.

S403. The NES adds an identifier of the second controller and the user group list corresponding to the second controller to a preset correspondence between a user group and a controller.

For example, the NES may record the identifier of the second controller, to use the second controller as an available controller resource, and use the second controller when initially allocating a UE message. The NES may further add, to the preset correspondence between a user group and a controller, an entry that uses each user group identifier in the user group list corresponding to the second controller as a keyword, and a controller value corresponding to each user group identifier is the identifier of the second controller.

Figure 5:
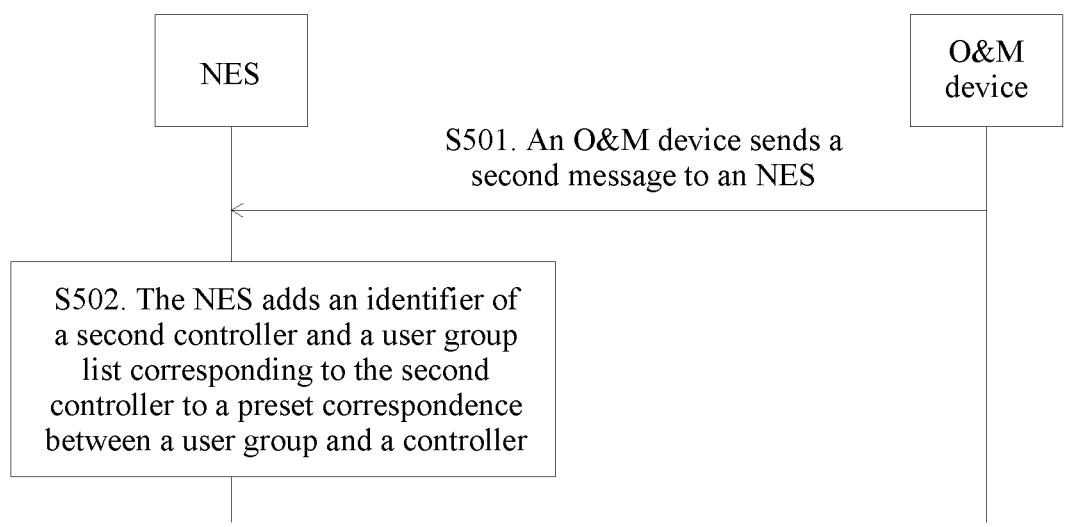
FIG. 5 is a flowchart of an information transmission method in another controller adding scenario according to an embodiment of this application.

Optionally, an embodiment of this application may provide an information transmission method in a controller adding scenario. FIG. 5 is a flowchart of an information transmission method in another controller adding scenario according to an embodiment of this application. As shown in FIG. 5, the method may further include the following steps.

S501. An O&M device sends a second message to an NES.

The second message includes an identifier of a second controller and a user group list corresponding to the second controller. When determining that a quantity of existing controllers is less than or equal to a preset value and a quantity of UEs is greater than or equal to a preset value, that is, the quantity of existing controllers is relatively small and currently the quantity of UEs is relatively large, the O&M device may determine that controller resources need to be extended, that is, a controller needs to be added. Therefore, the O&M device sends the second message to the NES.

Correspondingly, the NES receives the second message from the O&M device.

S502. The NES adds an identifier of a second controller and a user group list corresponding to the second controller to a preset correspondence between a user group and a controller.

For a specific implementation process of S502, refer to S403. Details are not described herein again.

It should be noted that the foregoing information transmission methods in controller adding scenarios shown in FIG. 4 and FIG. 5 are merely described by using examples. This constitutes no limitation on the embodiments of this application. The information transmission methods in controller adding scenarios shown in FIG. 4 and FIG. 5 may be performed before the information transmission method shown in FIG. 3, or may be performed after the information transmission method shown in FIG. 3. This is not limited in the embodiments of this application.

For example, if the information transmission methods in controller adding scenarios shown in FIG. 4 and FIG. 5 are performed before the information transmission method shown in FIG. 3, the first controller corresponding to the first user group may be the second controller, or may be another controller.

If the information transmission methods in controller adding scenarios shown in FIG. 4 and FIG. 5 are performed after the information transmission method shown in FIG. 3, the first controller corresponding to the first user group may be any controller other than the second controller.

In the embodiments of this application, FIG. 4 and FIG. 5 are used as examples to provide the information transmission methods in controller adding scenarios. Flexible scaling of controller resources can be implemented in a manner of adding a controller to a network. In addition, the identifier of the second controller and the user group list corresponding to the second controller are added to the preset correspondence between a user group and a controller, so that the correspondence in the NES can adapt to the controller resources. Therefore, signaling load can be flexibly allocated, and service flexibility can be improved after the controller is added.

Figure 6:
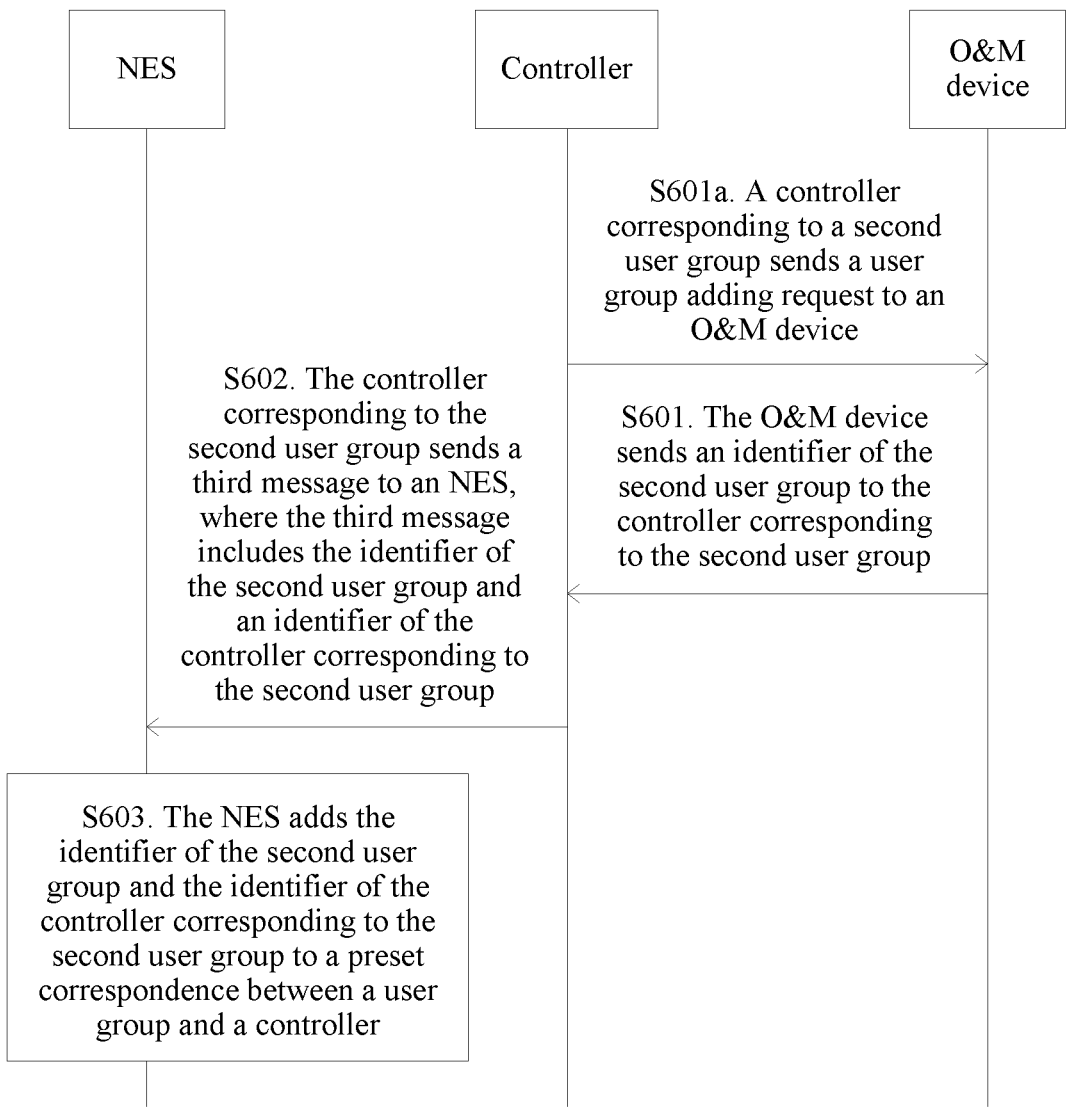
FIG. 6 is a flowchart of an information transmission method in a user group adding scenario according to an embodiment of this application.

Optionally, an embodiment of this application may further provide an information transmission method in a user group adding scenario. FIG. 6 is a flowchart of an information transmission method in a user group adding scenario according to an embodiment of this application disclosure. As shown in FIG. 6, the method may include the following steps.

S601. An O&M device sends an identifier of a second user group to a controller corresponding to the second user group.

Correspondingly, the controller corresponding to the second user group receives the identifier of the second user group from the O&M device.

After receiving the identifier of the second user group, the controller corresponding to the second user group may add the identifier of the second user group to an existing user group list of the controller corresponding to the second user group, to allocate a user group identifier to each user group in the user group list based on the user group list, and allocate a temporary identifier to UE in each user group.

When determining that a quantity of UEs is greater than a preset value, the O&M device may determine that a user group needs to be added, so that a network can serve the UEs. Therefore, the O&M device sends the identifier of the second user group, that is, an identifier of the to-be-added user group, to the controller corresponding to the second user group, so that the controller corresponding to the second user group sends a third message to an NES.

Optionally, before the O&M device sends the identifier of the second user group to the controller corresponding to the second user group in S601, the method may further include the following step:

S601a. The controller corresponding to the second user group sends a user group adding request to the O&M device.

In other words, the identifier of the second user group may be actively configured by the O&M device, or may be requested by the controller corresponding to the second user group from the O&M device. When determining that a quantity of existing user groups is less than or equal to a preset quantity of user groups, the controller corresponding to the second user group may determine that a new user group needs to be added, and therefore send the user group adding request to the O&M device.

S602. The controller corresponding to the second user group sends a third message to an NES, where the third message includes the identifier of the second user group and an identifier of the controller corresponding to the second user group.

The third message may be a user group adding message.

Correspondingly, the NES receives the third message from the controller corresponding to the second user group.

S603. The NES adds the identifier of the second user group and the identifier of the controller corresponding to the second user group to a preset correspondence between a user group and a controller.

The NES may add, to the preset correspondence between a user group and a controller, an entry that uses the identifier of the second user group as a keyword, and a controller value corresponding to the identifier of the second user group is the identifier of the controller corresponding to the second user group.

Figure 7:
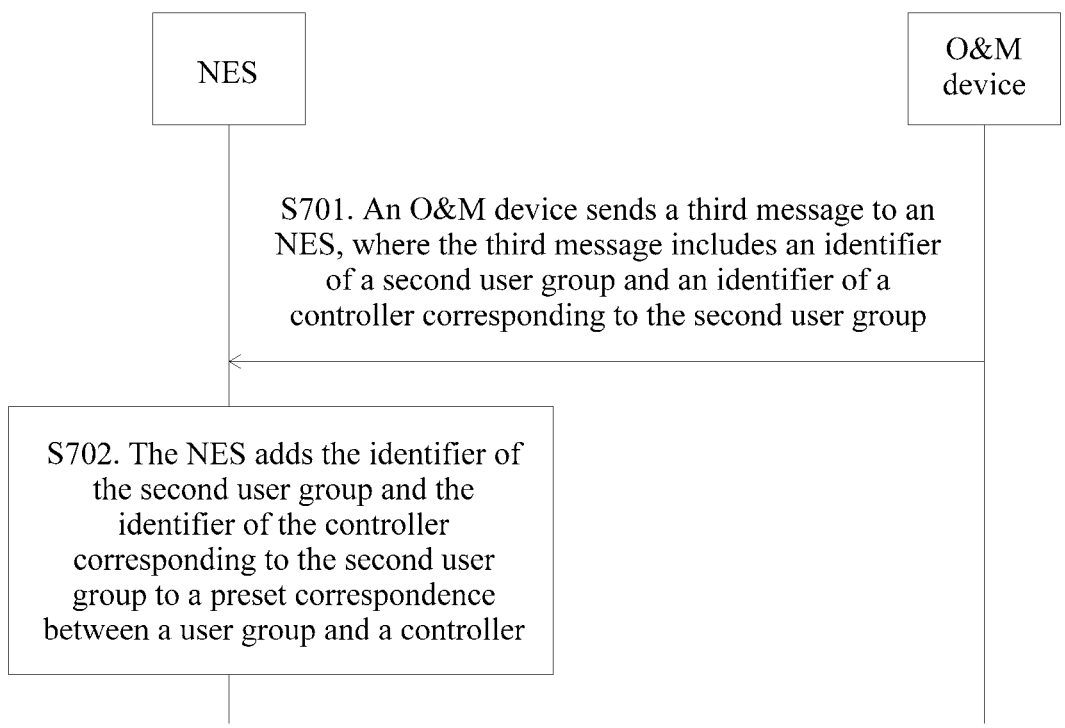
FIG. 7 is a flowchart of an information transmission method in another user group adding scenario according to an embodiment of this application.

Optionally, an embodiment of this application may further provide an information transmission method in a user group adding scenario. FIG. 7 is a flowchart of an information transmission method in another user group adding scenario according to an embodiment of this application. As shown in FIG. 7, the method may include the following steps.

S701. An O&M device sends a third message to an NES, where the third message includes an identifier of a second user group and an identifier of a controller corresponding to the second user group.

Correspondingly, the NES receives the third message from the O&M device.

When determining that a quantity of existing user groups of the controller corresponding to the second user group is less than or equal to a preset quantity of user groups, the O&M device may determine that a new user group needs to be added, and therefore send the third message to the NES.

S702. The NES adds the identifier of the second user group and the identifier of the controller corresponding to the second user group to a preset correspondence between a user group and a controller.

For a specific implementation process of S702, refer to S603. Details are not described herein again.

It should be noted that the foregoing information transmission methods in user group adding scenarios shown in FIG. 6 and FIG. 7 are merely described by using examples. This constitutes no limitation on the embodiments of this application. The information transmission methods in user group adding scenarios shown in FIG. 6 and FIG. 7 may be performed before the information transmission method shown in FIG. 3, or may be performed after the information transmission method shown in FIG. 3. This is not limited in the embodiments of this application.

For example, if the information transmission methods in user group adding scenarios shown in FIG. 6 and FIG. 7 are performed before the information transmission method shown in FIG. 3, the first controller corresponding to the first user group may be the controller corresponding to the second user group, or may be another controller.

If the information transmission methods in user group adding scenarios shown in FIG. 6 and FIG. 7 are performed after the information transmission method shown in FIG. 3, the first controller corresponding to the first user group may be any controller other than the controller corresponding to the second user group.

In the embodiments of this application, FIG. 6 and FIG. 7 are used as examples to provide the information transmission methods in user group adding scenarios. A quantity of user groups corresponding to a controller can be flexibly changed in a manner of adding a user group to a network. In addition, an identifier of the added user group and a user group list corresponding to a controller corresponding to the added user group are added to a preset correspondence between a user group and a controller, so that signaling load can be flexibly allocated, and service flexibility can be improved.

Figure 8:
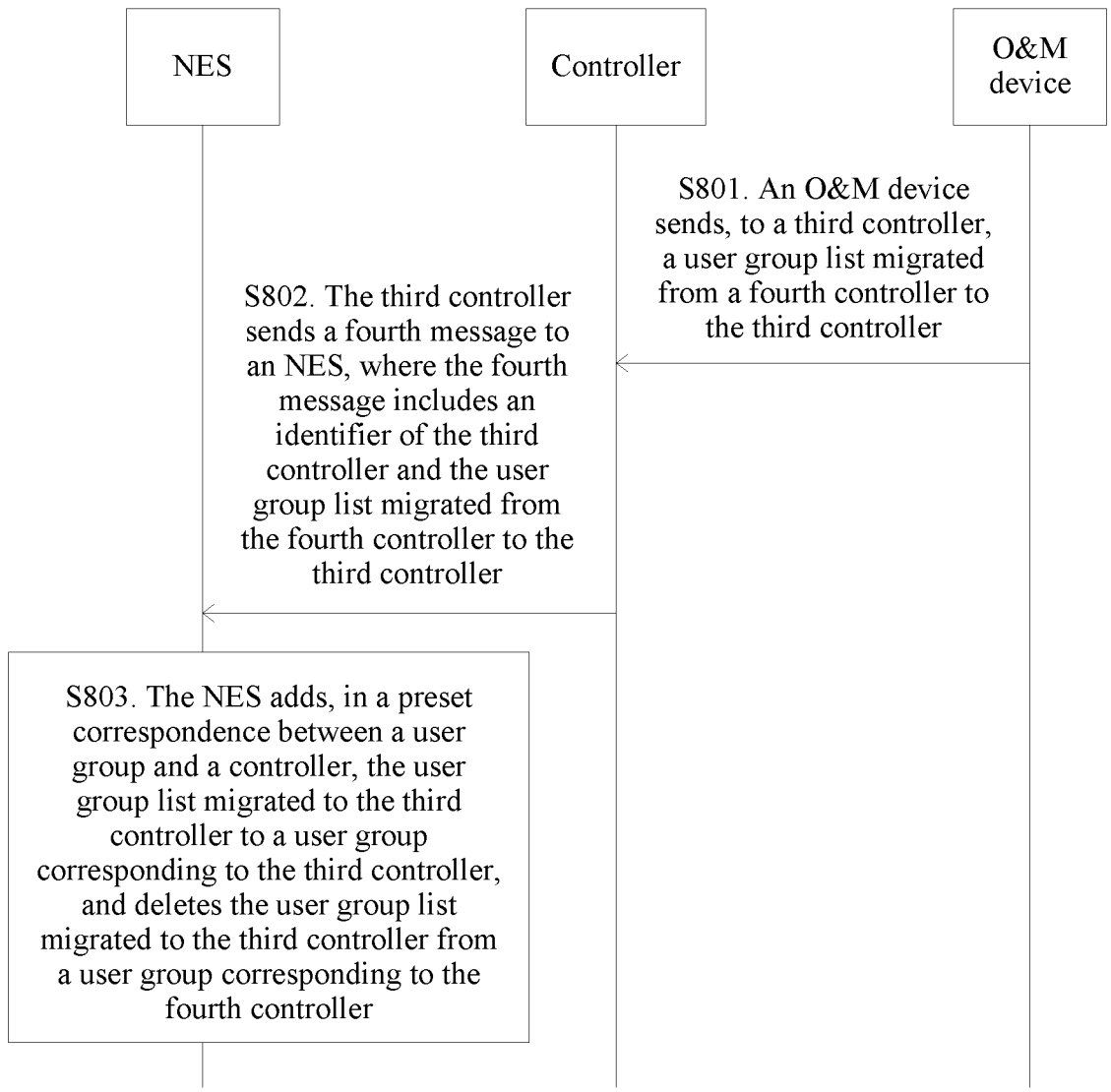
FIG. 8 is a flowchart of an information transmission method in a load migration scenario according to an embodiment of this application.

Optionally, an embodiment of this application may further provide an information transmission method in a load migration scenario. FIG. 8 is a flowchart of an information transmission method in a load migration scenario according to an embodiment of this application. As shown in FIG. 8, the method may include the following steps.

S801. An O&M device sends, to a third controller, a user group list migrated from a fourth controller to the third controller.

The third controller may be a target controller (Target Controller), and the fourth controller may be a source controller.

Correspondingly, the third controller receives, from the O&M device, the user group list migrated from the fourth controller to the third controller.

When determining that a quantity of user groups corresponding to the third controller is less than or equal to a quantity of user groups corresponding to the fourth controller, that is, when load corresponding to the third controller and load corresponding to the fourth controller are imbalanced, the O&M device may send, to the third controller, the user group list migrated from the fourth controller to the third controller, so that the third controller sends a fourth message to the NES, to implement load migration, thereby implementing load balancing between the third controller and the fourth controller.

In other words, the user group list migrated to the third controller may be determined by the O&M device and sent to the third controller. After receiving the user group list migrated to the third controller, the third controller may further send a context data obtaining request to a database server (Database Server), where the request may include the user group list migrated to the third controller, and receive context data that is returned by the database server and that is of a user in the user group list migrated to the third controller. The third controller may further cache the received context data of the user in the user group list migrated to the third controller, for example, cache the context data in a local memory of the third controller. After obtaining the context data of the user in the user group list migrated to the third controller, the third controller may effectively implement, based on the context data, session persistence of the user in the user group list migrated to the third controller, and bind a session of the user in the user group list migrated to the third controller to the target controller.

S802. The third controller sends a fourth message to an NES, where the fourth message includes an identifier of the third controller and the user group list migrated from the fourth controller to the third controller.

The fourth message may be a load migration message.

Correspondingly, the NES receives the fourth message from the third controller.

S803. The NES adds, in a preset correspondence between a user group and a controller, the user group list migrated to the third controller to a user group corresponding to the third controller, and deletes the user group list migrated to the third controller from a user group corresponding to the fourth controller.

The NES deletes the user group list migrated to the third controller from the user group corresponding to the fourth controller in the preset correspondence between a user group and a controller, migrates the user group list migrated to the third controller from the fourth controller, and adds the user group list migrated to the third controller to the user group corresponding to the third controller, to migrate the user group list migrated to the third controller to the third controller, thereby implementing migration of the user group list from the fourth controller to the third controller.

Figure 9:
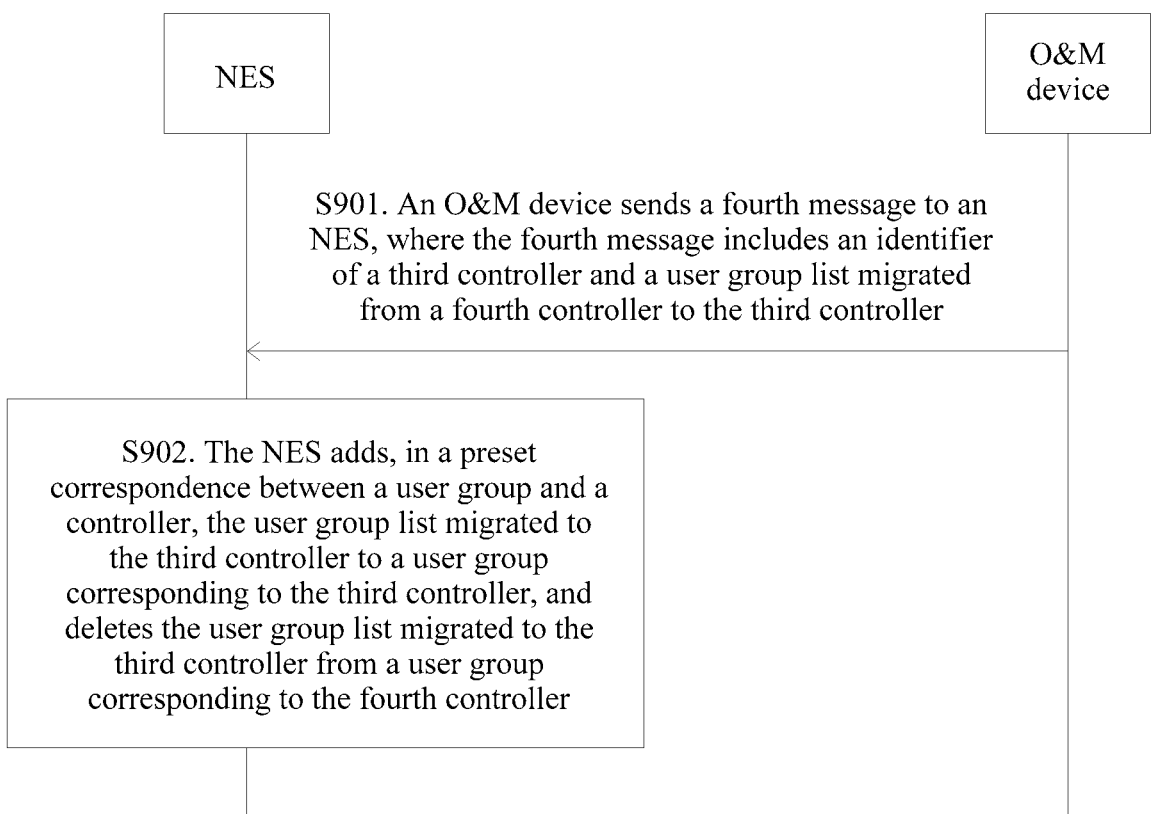
FIG. 9 is a flowchart of an information transmission method in another load migration scenario according to an embodiment of this application.

Optionally, an embodiment of this application may further provide an information transmission method in a load migration scenario. FIG. 9 is a flowchart of an information transmission method in another load migration scenario according to an embodiment of this application. As shown in FIG. 9, the method may include the following steps.

S901. An O&M device sends a fourth message to an NES, where the fourth message includes an identifier of a third controller and a user group list migrated from a fourth controller to the third controller.

In other words, the NES receives the fourth message from the O&M device.

When determining that a quantity of user groups corresponding to the third controller is less than or equal to a quantity of user groups corresponding to the fourth controller, that is, when load corresponding to the third controller and load corresponding to the fourth controller are imbalanced, the O&M device may send the fourth message to the NES, to implement load migration, thereby implementing load balancing between the third controller and the fourth controller.

S902. The NES adds, in a preset correspondence between a user group and a controller, the user group list migrated to the third controller to a user group corresponding to the third controller, and deletes the user group list migrated to the third controller from a user group corresponding to the fourth controller.

For a specific implementation process of S902, refer to S803. Details are not described herein again.

It should be noted that the foregoing information transmission methods in load migration scenarios shown in FIG. 8 and FIG. 9 are merely described by using examples. This constitutes no limitation on the embodiments of this application. The information transmission methods in load migration scenarios shown in FIG. 8 and FIG. 9 may be performed before the information transmission method shown in FIG. 3, or may be performed after the information transmission method shown in FIG. 3. This is not limited in the embodiments of this application.

In the embodiments of this application, FIG. 8 and FIG. 9 are used as examples to provide the information transmission methods in load migration scenarios, to more flexibly implement load balancing between controllers.

Figure 10:
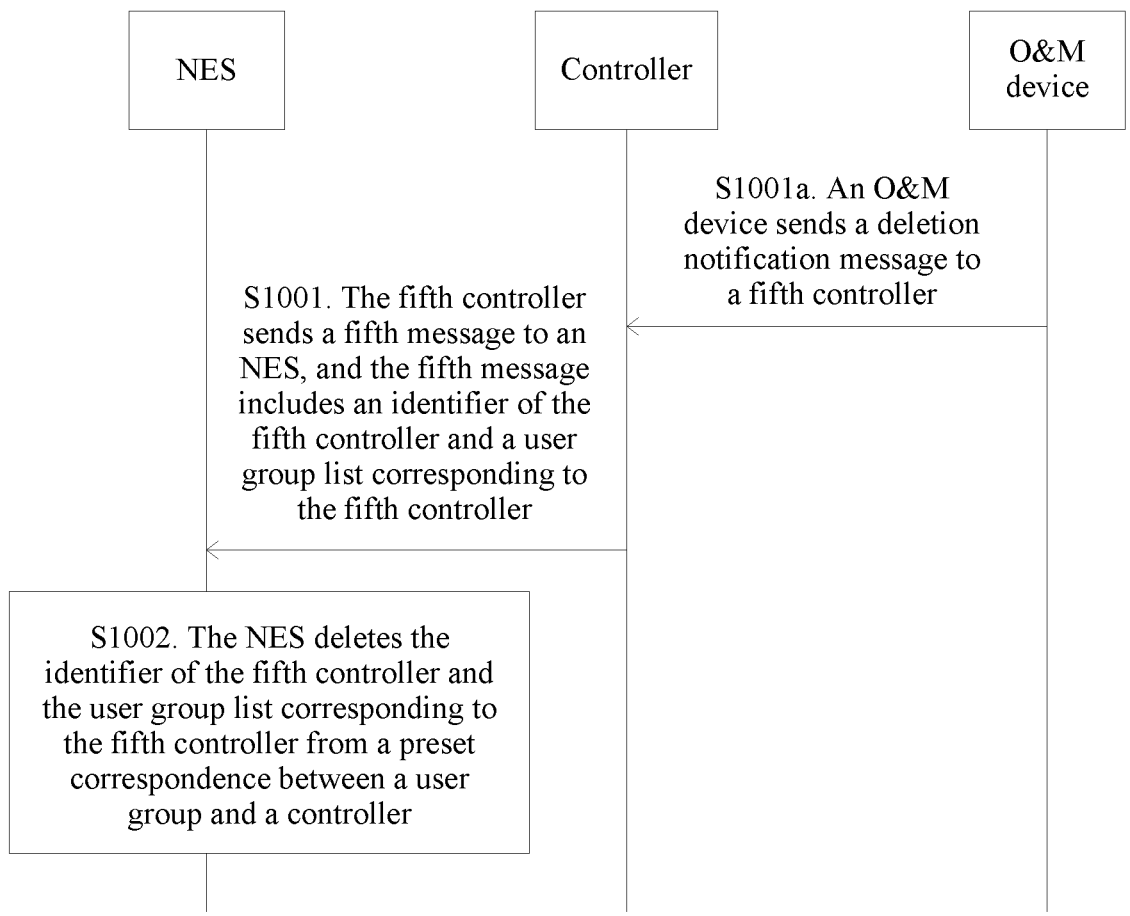
FIG. 10 is a flowchart of an information transmission method in a controller deleting scenario according to an embodiment of this application.

Optionally, an embodiment of this application may further provide an information transmission method in a controller deleting scenario. FIG. 10 is a flowchart of an information transmission method in a controller deleting scenario according to an embodiment of this application. As shown in FIG. 10, the method may include the following steps.

S1001. A fifth controller sends a fifth message to an NES, where the fifth message includes an identifier of the fifth controller and a user group list corresponding to the fifth controller.

Correspondingly, the NES receives the fifth message from the fifth controller. The fifth message may be a controller deleting message.

When the fifth controller does not receive a message of UE in a user group corresponding to the fifth controller within a preset time period, or cannot perform corresponding signaling processing on the message of the UE, the fifth controller may determine that the fifth controller is in an idle state, or the fifth controller cannot meet a requirement of the UE, and therefore may send the fifth message to the NES.

Optionally, before the fifth controller sends the fifth message to the NES in S1001, the method may further include:

S1001a. An O&M device sends a deletion notification message to the fifth controller.

Correspondingly, the fifth controller receives the deletion notification message from the O&M device, and the fifth controller may send the fifth message to the NES after receiving the deletion notification message.

When determining that a quantity of existing controllers is greater than a preset value and a quantity of UEs is less than a preset value, that is, the quantity of existing controllers is relatively large and currently the quantity of UEs is relatively small, the O&M device may determine that current controller resources are sufficient, and the controller resources may be reduced, that is, a controller needs to be deleted. Therefore, the O&M device sends the deletion notification message to the fifth controller, so that the fifth controller sends the fifth message to the NES.

S1002. The NES deletes the identifier of the fifth controller and the user group list corresponding to the fifth controller from a preset correspondence between a user group and a controller.

For example, the NES may delete the previously recorded identifier of the fifth controller, to avoid using the fifth controller as an available controller resource when initially allocating a UE message. The NES may further delete, from the preset correspondence between a user group and a controller, an entry that uses each user group identifier in the user group list corresponding to the fifth controller as a keyword.

It should be noted that, the user group list included in the fifth message may be empty. In this case, performing S1002 is actually deleting the identifier of the fifth controller. The empty user group list is deleted, so that each user group in the user group list corresponding to the fifth controller in the preset correspondence between a user group and a controller actually remains valid, but does not have a correspondence with the fifth controller.

When the fifth controller is abnormal and fails, the fifth controller cannot send the fifth message to the NES. Therefore, the present disclosure may further provide an information transmission method. The NES may monitor the controller, and if finding that the fifth controller is abnormal and fails, the NES directly performs S1002 to delete the controller that is abnormal and fails.

Figure 11:
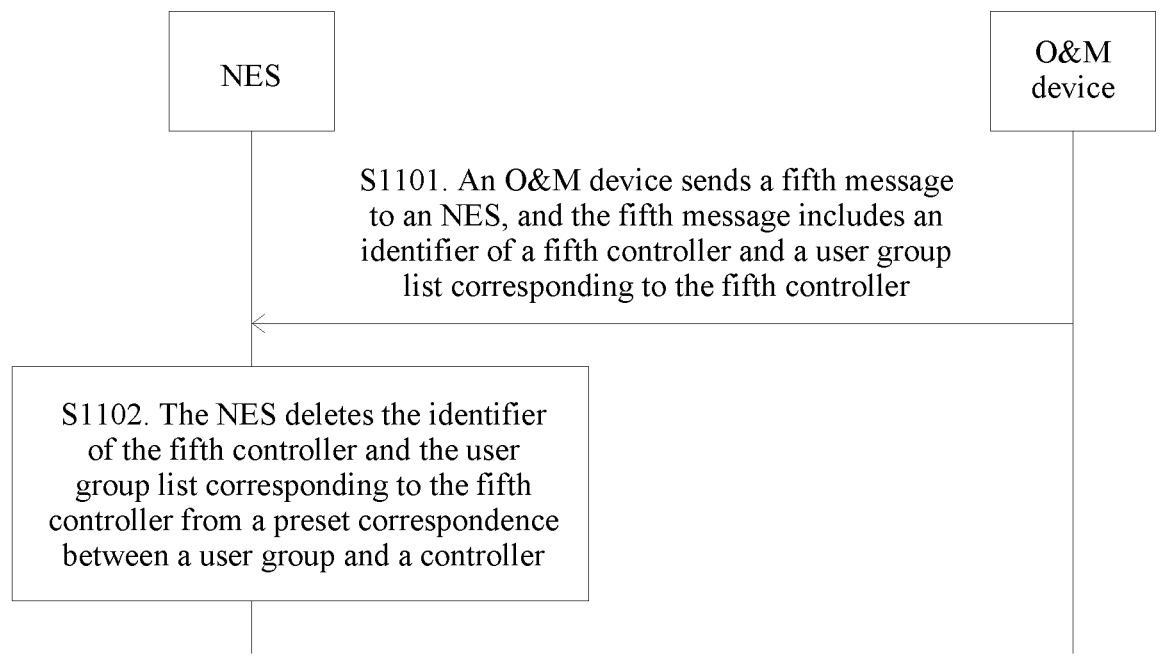
FIG. 11 is a flowchart of an information transmission method in another controller deleting scenario according to an embodiment of this application.

Optionally, an embodiment of this application may further provide an information transmission method in a controller deleting scenario. FIG. 11 is a flowchart of an information transmission method in another controller deleting scenario according to an embodiment of this application. As shown in FIG. 11, the method may include the following steps.

S1101. An O&M device sends a fifth message to an NES, and the fifth message includes an identifier of a fifth controller and a user group list corresponding to the fifth controller.

In other words, the NES receives the fifth message from the O&M device.

When determining that a quantity of existing controllers is greater than a preset value and a quantity of UEs is less than a preset value, that is, the quantity of existing controllers is relatively large and currently the quantity of UEs is relatively small, the O&M device may determine that current controller resources are sufficient, and the controller resources may be reduced, that is, a controller needs to be deleted. However, the fifth controller is abnormal and fails, and therefore, the O&M device may directly send the fifth message to the NES.

S1102. The NES deletes the identifier of the fifth controller and the user group list corresponding to the fifth controller from a preset correspondence between a user group and a controller.

For a specific implementation process of S1102, refer to S1002. Details are not described herein again.

It should be noted that the foregoing information transmission methods in controller deleting scenarios shown in FIG. 10 and FIG. 11 are merely described by using examples. This constitutes no limitation on the embodiments of this application. The information transmission methods in controller deleting scenarios shown in FIG. 10 and FIG. 11 may be performed before the information transmission method shown in FIG. 3, or may be performed after the information transmission method shown in FIG. 3. This is not limited in the embodiments of this application.

In the embodiments of this application, FIG. 10 and FIG. 11 are used as examples to provide the information transmission methods in controller deleting scenarios. Flexible scaling of controller resources can be implemented in a manner of deleting a controller from a network. In addition, the identifier of the fifth controller and the user group list corresponding to the fifth controller are deleted from the preset correspondence between a user group and a controller, so that the correspondence in the NES can adapt to the controller resources. Therefore, signaling load can be flexibly allocated, and service flexibility can be improved after the controller is deleted.

Figure 12:
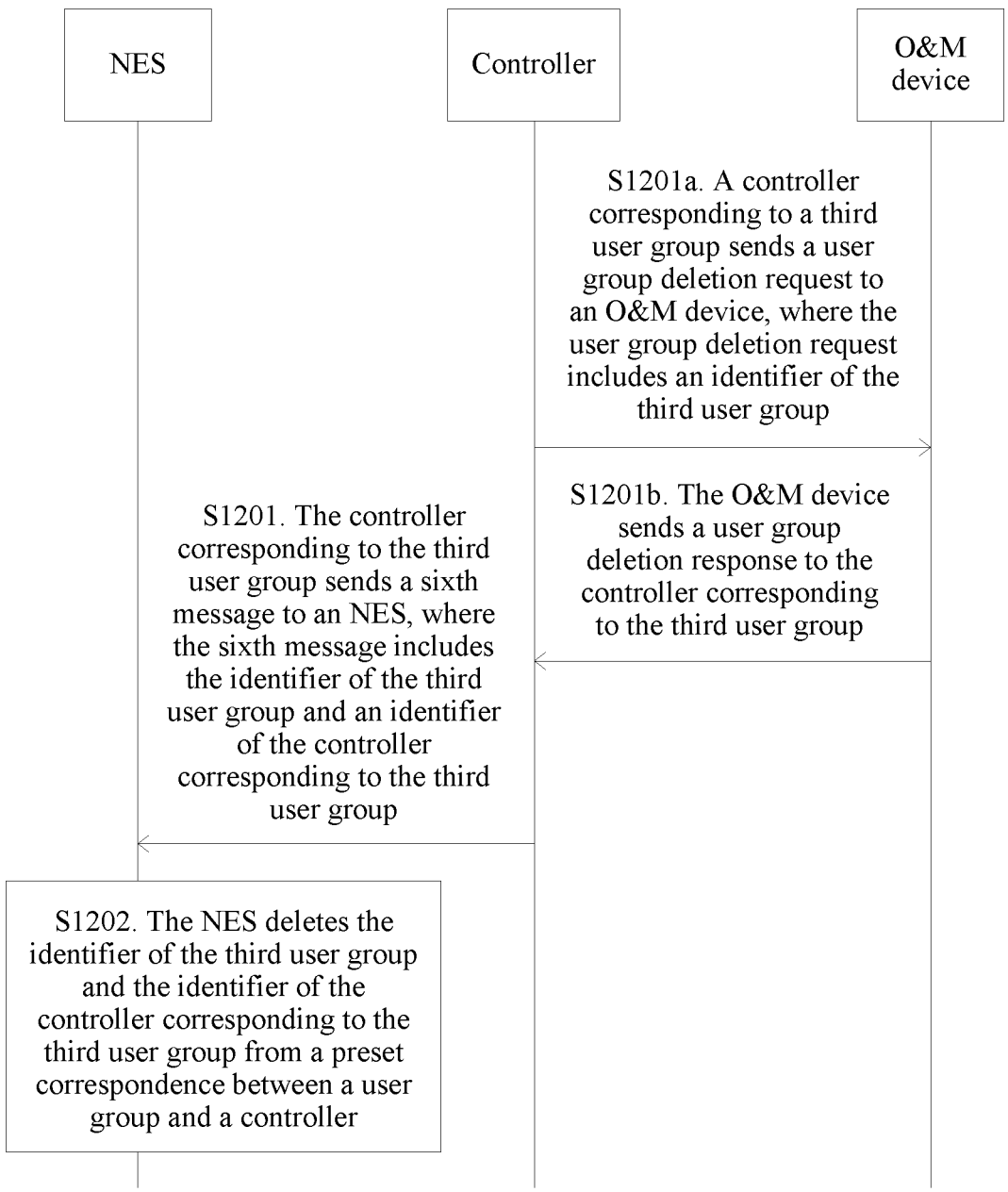
FIG. 12 is a flowchart of an information transmission method in a user group deleting scenario according to an embodiment of this application.

Optionally, an embodiment of this application may further provide an information transmission method in a user group deleting scenario. FIG. 12 is a flowchart of an information transmission method in a user group deleting scenario according to an embodiment of this application. As shown in FIG. 12, the method may include the following steps.

S1201. A controller corresponding to a third user group sends a sixth message to an NES, where the sixth message includes an identifier of the third user group and an identifier of the controller corresponding to the third user group.

The sixth message may be a user group deleting message. Correspondingly, the NES receives the sixth message from the controller corresponding to the third user group.

When determining that a quantity of existing user groups is greater than a preset quantity of user groups, the controller corresponding to the third user group may determine that some user groups need to be deleted, and therefore send the sixth message to the NES.

Optionally, before the controller corresponding to the third user group sends the sixth message to the NES in S1201, the method may further include:

S1201a. The controller corresponding to the third user group sends a user group deletion request to an O&M device, where the user group deletion request includes an identifier of the third user group.

S1201b. The O&M device sends a user group deletion response to the controller corresponding to the third user group.

Correspondingly, the controller corresponding to the third user group receives the user group deletion response from the O&M device.

For example, the controller corresponding to the third user group may send the sixth message to the NES after receiving the user group deletion response sent by the O&M device.

S1202. The NES deletes the identifier of the third user group and the identifier of the controller corresponding to the third user group from a preset correspondence between a user group and a controller.

Figure 13:
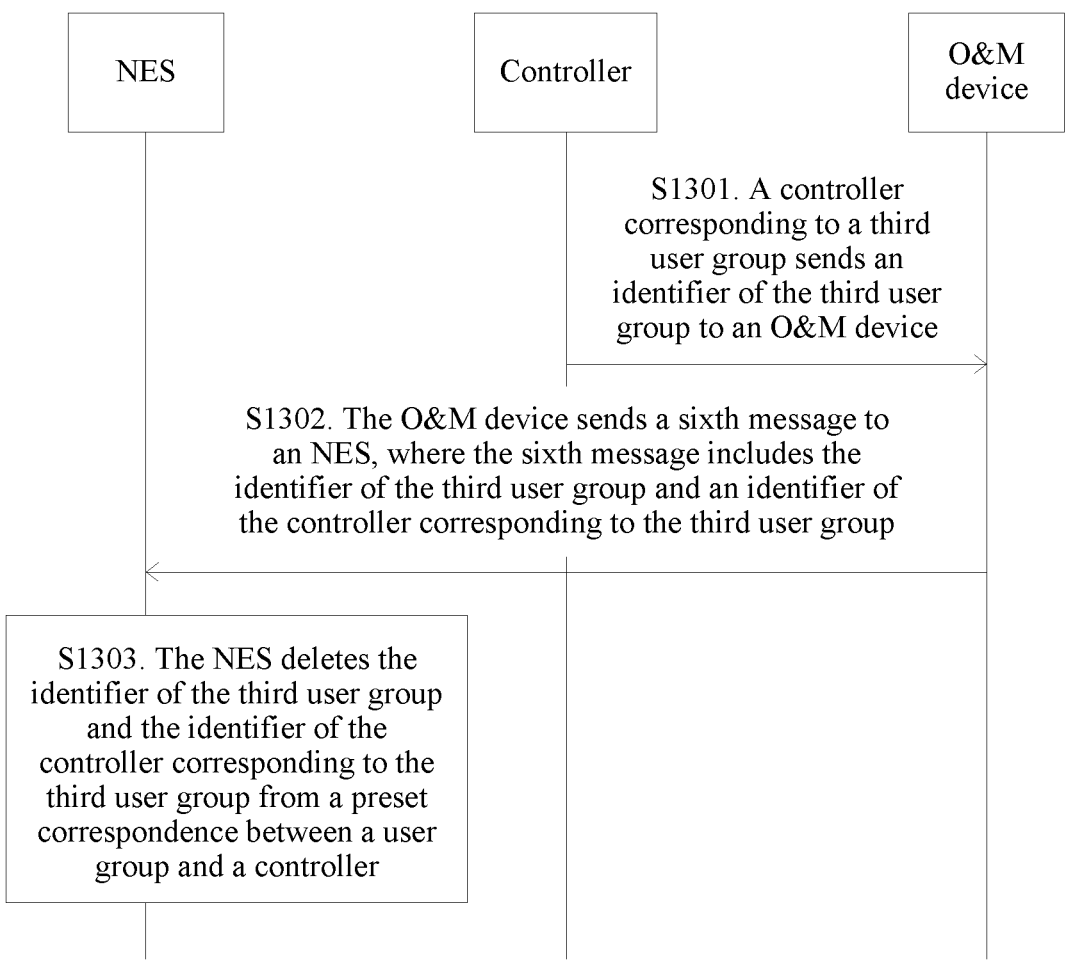
FIG. 13 is a flowchart of an information transmission method in another user group deleting scenario according to an embodiment of this application.

Optionally, an embodiment of this application may further provide an information transmission method in a user group deleting scenario. FIG. 13 is a flowchart of an information transmission method in another user group deleting scenario according to an embodiment of this application. As shown in FIG. 13, the method may include the following steps.

S1301. A controller corresponding to a third user group sends an identifier of the third user group to an O&M device.

For example, the O&M device may receive a user group deletion request from the controller corresponding to the third user group, and the user group deletion request may include the identifier of the third user group. Optionally, the O&M device may further send a user group deletion response to the controller corresponding to the third user group.

When determining that a quantity of existing user groups is greater than a preset quantity of user groups, the controller corresponding to the third user group may determine that some user groups need to be deleted, and therefore send the identifier of the third user group to the O&M device, so that the O&M device sends, to the NES, a sixth message including the identifier of the third user group.

S1302. The O&M device sends a sixth message to an NES, where the sixth message includes the identifier of the third user group and an identifier of the controller corresponding to the third user group.

In other words, the NES receives the sixth message from the O&M device.

S1303. The NES deletes the identifier of the third user group and the identifier of the controller corresponding to the third user group from a preset correspondence between a user group and a controller.

Optionally, in any of the foregoing information transmission methods, the external network element may include any one of the following: UE, a base station, a gateway user plane entity, or the like.

Optionally, in any of the foregoing information transmission methods, the identification information of the UE includes a temporary identifier of the UE and an identifier of a user group to which the UE belongs. For example, both the temporary identifier of the UE and the identifier of the user group to which the UE belongs are allocated by a controller corresponding to the user group to which the UE belongs.

In the embodiments of this application, FIG. 12 and FIG. 13 are used as examples to provide the information transmission methods in user group deleting scenarios. A quantity of user groups corresponding to a controller can be flexibly changed in a manner of deleting a user group from a network. In addition, the identifier of the third user group and a user group list corresponding to the controller corresponding to the third user group are deleted from the preset correspondence between a user group and a controller, so that signaling load can be flexibly allocated, and service flexibility can be improved.

Figure 14:
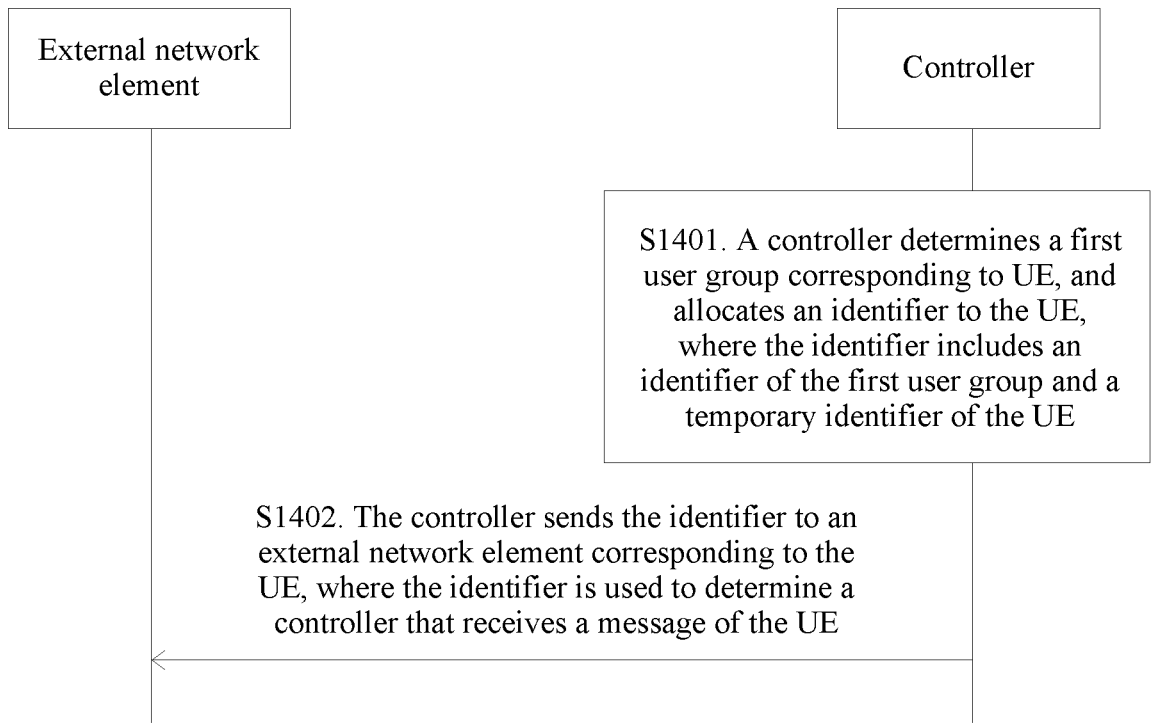
FIG. 14 is a flowchart of another information transmission method according to an embodiment of this application.

Optionally, an embodiment of this application further provides an information transmission method. FIG. 14 is a flowchart of another information transmission method according to an embodiment of this application. As shown in FIG. 14, the method may include the following steps.

S1401. A controller determines a first user group corresponding to UE, and allocates an identifier to the UE, where the identifier includes an identifier of the first user group and a temporary identifier of the UE.

For example, the controller may determine, based on a user group list corresponding to the controller, the first user group to which the UE belongs, determine an identifier of a user group corresponding to the UE as the identifier of the first user group, and allocate the temporary identifier of the UE to the UE. The controller may allocate the temporary identifier of the UE to the UE based on a temporary identifier of existing UE in the first user group, so that the temporary identifier of the UE is different from the temporary identifier of the existing UE, to distinguish UEs in the first user group.

S1402. The controller sends the identifier to an external network element corresponding to the UE, where the identifier is used to determine a controller that receives a message of the UE.

A method of determining, based on the identifier, the controller that receives the message of the UE may be similar to the method shown in FIG. 3. For details, refer to the foregoing description. Details are not described herein again.

Optionally, the controller may further send the identifier to an NES, so that the NES determines, based on the identifier, the first user group corresponding to the UE.

According to the information transmission method provided in this embodiment of this application, the controller may determine the first user group corresponding to the UE, determine the identifier of the first user group and the temporary identifier of the UE for the UE, and send the identifier to the external network element corresponding to the UE, where the identifier is used to determine the controller that receives the message of the UE. In the foregoing method, the NES may determine, based on the identifier allocated by the controller to the UE, the controller corresponding to the user group to which the UE belongs. In other words, in the method, the NES may select a controller on a per-user group basis instead of a per-user basis, thereby reducing complexity of selecting the controller and improving signaling processing efficiency.

It should be noted that, in the method shown in FIG. 14, a solution in which the controller allocates the identifier to the UE, and sends the identifier to the external network element may be performed before the NES receives the first message from the external network element in S301 shown in FIG. 3.

Figure 15:
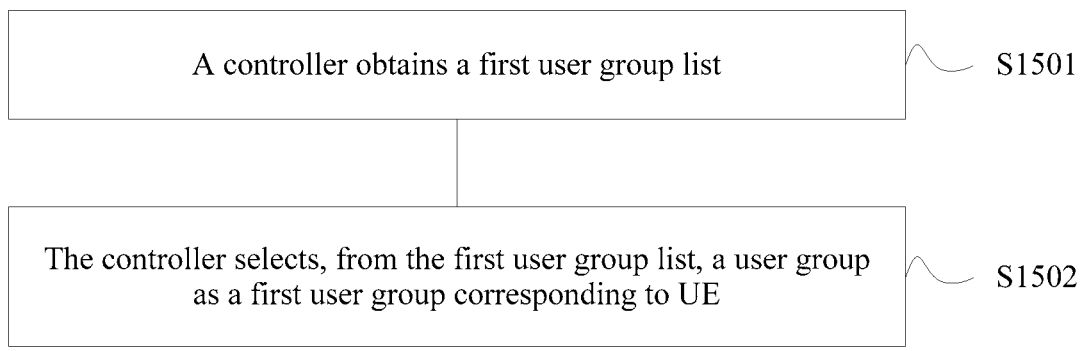
FIG. 15 is a flowchart of still another information transmission method according to an embodiment of this application.

Optionally, an embodiment of this application further provides an information transmission method. FIG. 15 is a flowchart of still another information transmission method according to an embodiment of this application. As shown in FIG. 15, in the method, that the controller determines the first user group corresponding to the UE in S1401 may include the following steps.

S1501. The controller obtains a first user group list.

For example, the controller may determine a pre-stored user group list corresponding to the controller as the first user group list. The controller may alternatively determine a received user group list that is sent by another device and that is corresponding to the controller as the first user group list. The controller may alternatively generate the first user group list based on an identifier of a user group or a user group list obtained from another device, and an existing user group list of the controller.

S1502. The controller selects, from the first user group list, a user group as the first user group corresponding to the UE.

The first user group list may include at least one user group, and the controller may select a user group from the at least one user group as the first user group corresponding to the UE.

For example, the controller may randomly select a user group from the at least one user group as the first user group corresponding to the UE. Alternatively, the controller may select, based on a quantity of UEs in each user group in the at least one user group, a user group with a minimum quantity of UEs as the first user group corresponding to the UE. Certainly, the controller may also select, in another manner, a user group from the at least one user group as the first user group corresponding to the UE.

Optionally, in a controller adding scenario, the controller described above may be an added controller, for example, the second controller in either FIG. 4 or FIG. 5, and the first user group list may be a user group list corresponding to the second controller. In the foregoing method, that the controller obtains the first user group list in S1501 may include:

receiving, by the controller, the first user group list from an O&M device.

The added controller does not have a user group list originally. Therefore, the controller may use the user group list received from the O&M device as the first user group list corresponding to the controller.

Figure 16:
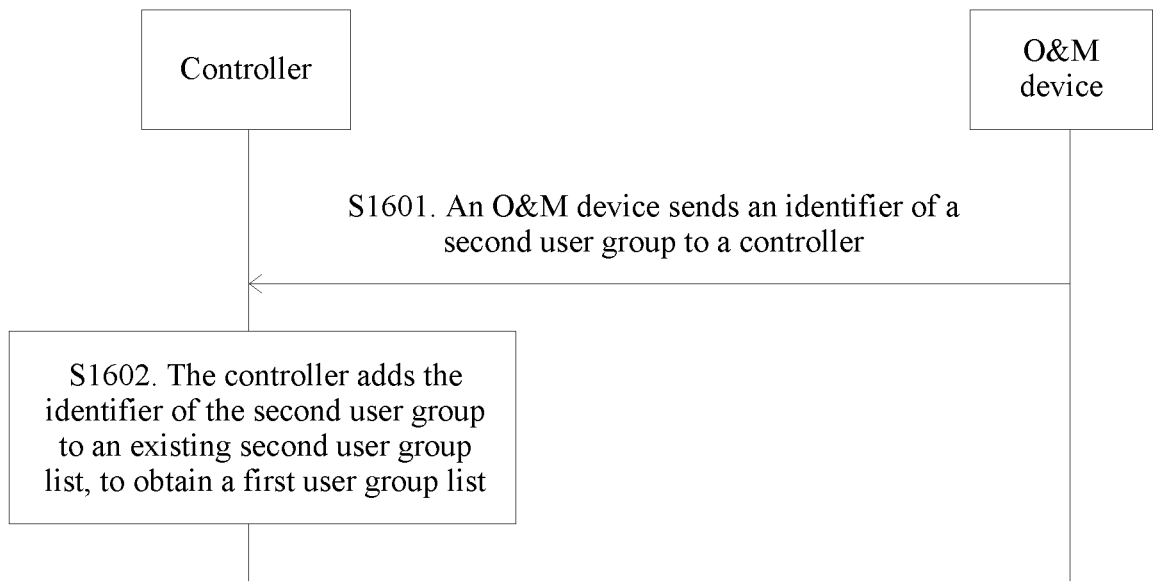
FIG. 16 is a flowchart of an information transmission method in still another user group adding scenario according to an embodiment of this application.

Optionally, in a user group adding scenario, the controller may be a controller corresponding to an added user group, for example, the controller corresponding to the second user group shown in FIG. 6 or FIG. 7. FIG. 16 is a flowchart of an information transmission method in still another user group adding scenario according to an embodiment of this application. As shown in FIG. 16, in the user group adding scenario, that the controller obtains the first user group list in S1501 in the foregoing method may include the following steps.

S1601. An O&M device sends an identifier of a second user group to the controller.

Correspondingly, the controller receives the identifier of the second user group from the O&M device.

S1602. The controller adds the identifier of the second user group to an existing second user group list, to obtain the first user group list.

The controller has the second user group list in the user group adding scenario. Therefore, the second user group can be added to the controller provided that the controller adds the identifier of the second user group obtained from the O&M device to the second user group list to obtain the first user group list.

Figure 17:
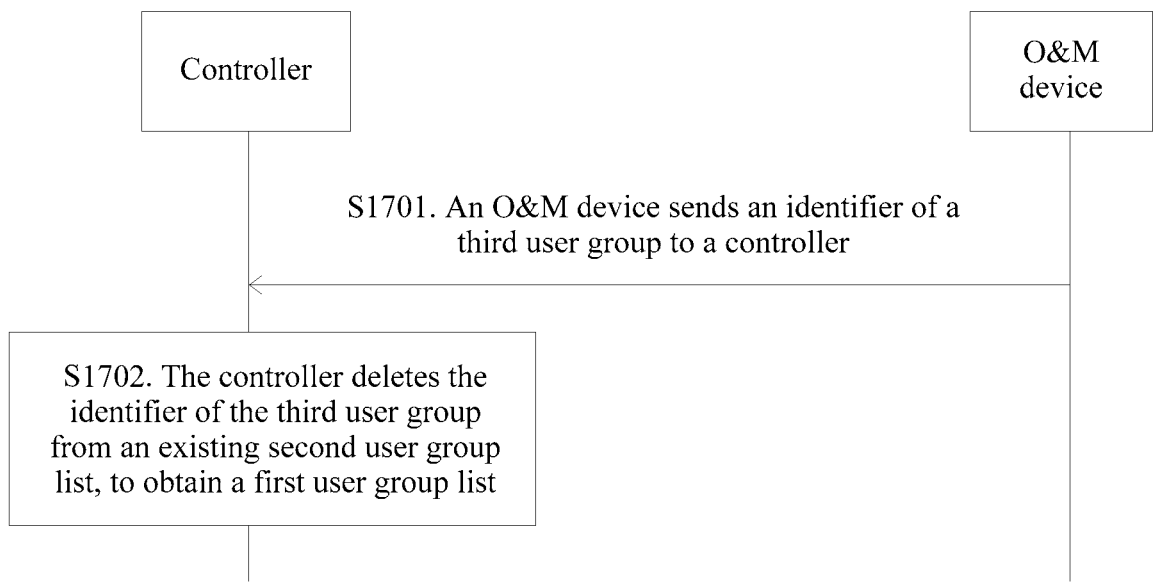
FIG. 17 is a flowchart of an information transmission method in still another user group deleting scenario according to an embodiment of this application.

Optionally, in a user group deleting scenario, the controller may be a controller corresponding to a deleted user group, for example, the controller corresponding to the third user group shown in FIG. 12 or FIG. 13. FIG. 17 is a flowchart of an information transmission method in still another user group deleting scenario according to an embodiment of this application. As shown in FIG. 17, in the user group deleting scenario, that the controller obtains the first user group list in S1501 in the foregoing method may include the following steps.

S1701. An O&M device sends an identifier of a third user group to the controller.

Correspondingly, the controller receives the identifier of the third user group from the O&M device.

S1702. The controller deletes the identifier of the third user group from an existing second user group list, to obtain the first user group list.

The controller has the second user group list in the user group deleting scenario. Therefore, the controller can obtain the first user group list provided that the controller deletes the identifier of the third user group that is obtained from the O&M device from the second user group list, so that the third user group is deleted from the controller.

Figure 18:
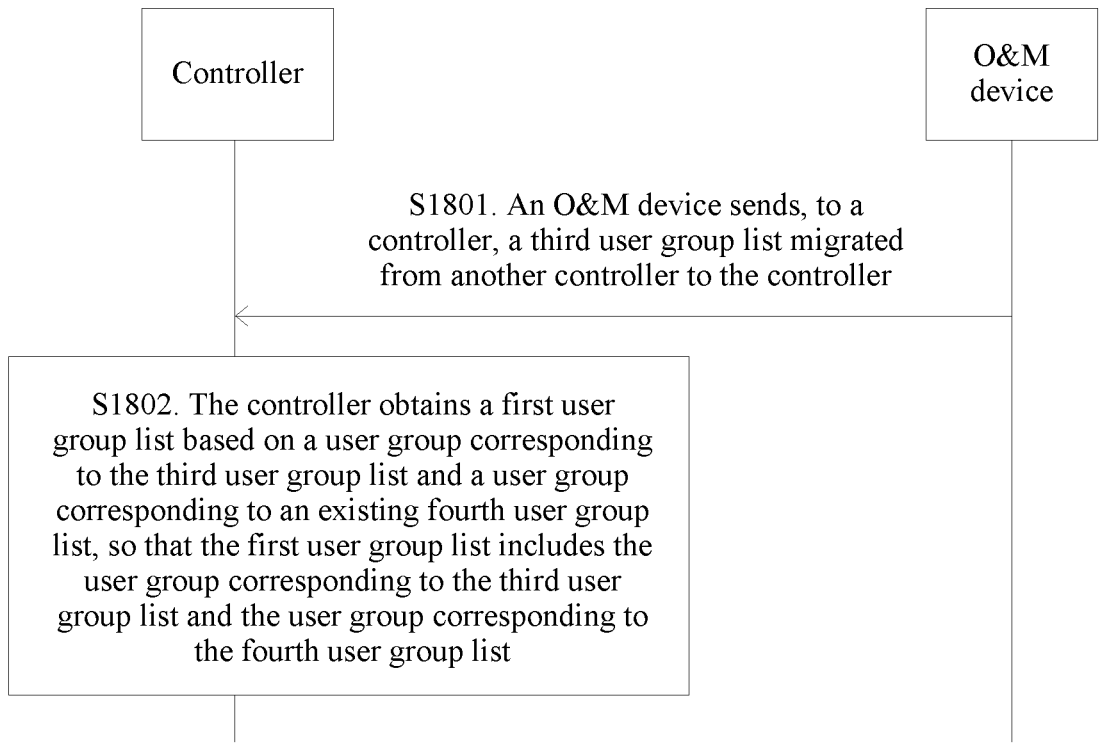
FIG. 18 is a flowchart of an information transmission method in still another load migration scenario according to an embodiment of this application.

Optionally, in a load migration scenario, the controller may be a target controller, for example, the third controller shown in FIG. 8 or FIG. 9. FIG. 18 is a flowchart of an information transmission method in still another load migration scenario according to an embodiment of this application. As shown in FIG. 18, in the load migration scenario, that the controller obtains the first user group list in S1501 in the foregoing method may include the following steps.

S1801. An O&M device sends, to the controller, a third user group list migrated from another controller to the controller.

Correspondingly, the controller receives the third user group list from the O&M device.

The another controller may be the fourth controller shown in FIG. 8 or FIG. 9.

S1802. The controller obtains the first user group list based on a user group corresponding to the third user group list and a user group corresponding to an existing fourth user group list, so that the first user group list includes the user group corresponding to the third user group list and the user group corresponding to the fourth user group list.

In the load migration scenario, the controller may add each user group in the third user group list to the fourth user group list instead of adding a user of each user group in the third user group list to a user group of the existing fourth user group list, to obtain the first user group list, so that the first user group list includes the user group corresponding to the third user group list and the user group corresponding to the fourth user group list.

It should be noted that, in the load migration scenario, the controller may further add a user of each user group in the third user group list to the user group of the existing fourth user group list, to obtain the first user group list, so that a user group included in the first user group list is the same as the user group in the fourth user group list. However, at least one user group in the first user group list includes UE included in a corresponding user group in the third user group list.

According to the information transmission method provided in this embodiment of this application, a UE identifier is allocated in information transmission methods in the controller adding scenario, the user group adding scenario, and the user group deleting scenario, to effectively ensure scalability of a network system, implement flexible scaling of the controller, and improve service flexibility. In addition, in the information transmission method, a UE identifier is allocated in the information transmission method in the load migration scenario, so that load balancing between controllers can be more flexibly implemented.

Figure 19:
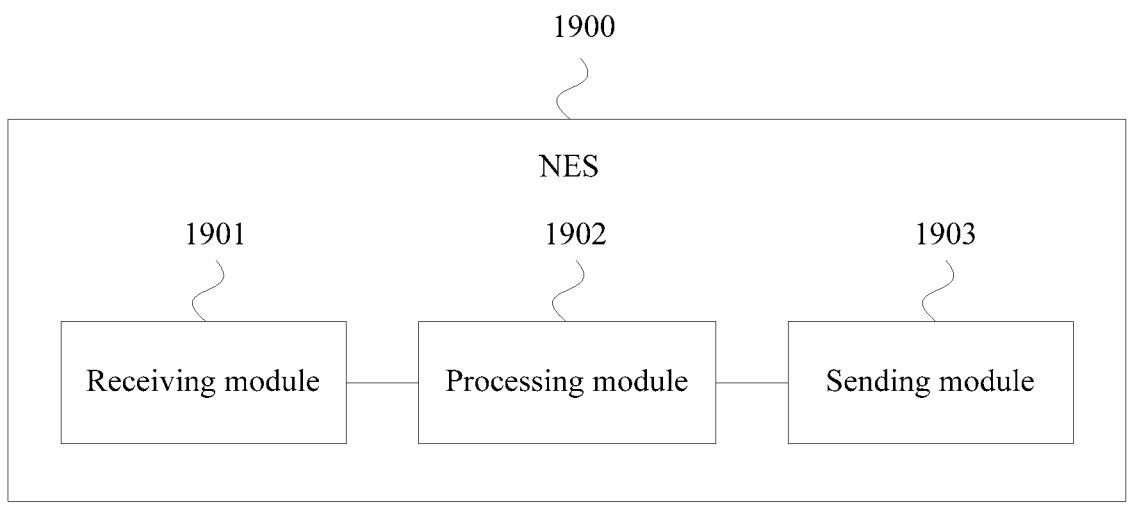
FIG. 19 is a schematic structural diagram of an NES according to an embodiment of this application.

An embodiment of this application further provides an NES. FIG. 19 is a schematic structural diagram of an NES 1900 according to an embodiment of this application. As shown in FIG. 19, the NES 1900 may include:

a receiving module 1901, configured to receive, from an external network element, a first message including identification information of UE;

a processing module 1902, configured to: determine, based on the identification information of the UE, a first user group to which the UE belongs; and determine a first controller corresponding to the first user group; and a sending module 1903, configured to send the first message to the first controller.

In a possible implementation, the processing module 1902 is specifically configured to determine, based on the first user group and a preset correspondence between a user group and a controller, the first controller corresponding to the first user group.

In another possible implementation, the receiving module 1901 is further configured to receive a second message including an identifier of a second controller and a user group list corresponding to the second controller; and the processing module 1902 is further configured to add the identifier of the second controller and the user group list corresponding to the second controller to the preset correspondence between a user group and a controller.

In still another possible implementation, the receiving module 1901 is specifically configured to receive the second message from the second controller or an O&M device.

In still another possible implementation, the receiving module 1901 is further configured to receive a third message, where the third message includes an identifier of a second user group and an identifier of a controller corresponding to the second user group; and the processing module 1902 is further configured to add the identifier of the second user group and the identifier of the controller corresponding to the second user group to the preset correspondence between a user group and a controller.

In still another possible implementation, the receiving module 1901 is specifically configured to receive the third message from the controller corresponding to the second user group or the O&M device.

In still another possible implementation, the receiving module 1901 is further configured to receive a fourth message, where the fourth message includes an identifier of a third controller and a user group list migrated from a fourth controller to the third controller; and the processing module 1902 is further configured to: add, in the preset correspondence between a user group and a controller, the user group list migrated to the third controller to a user group corresponding to the third controller, and delete the user group list migrated to the third controller from a user group corresponding to the fourth controller.

In still another possible implementation, the receiving module 1901 is specifically configured to receive the fourth message from the third controller or the O&M device.

In still another possible implementation, the receiving module 1901 is further configured to receive a fifth message, where the fifth message includes an identifier of a fifth controller and a user group list corresponding to the fifth controller; and the processing module 1902 is further configured to delete the identifier of the fifth controller and the user group list corresponding to the fifth controller from the preset correspondence between a user group and a controller.

In still another possible implementation, the receiving module 1901 is specifically configured to receive the fifth message from the fifth controller or the O&M device.

In still another possible implementation, the receiving module 1901 is further configured to receive a sixth message, where the sixth message includes an identifier of a third user group and an identifier of a controller corresponding to the third user group; and the processing module 1902 is further configured to delete the identifier of the third user group and the identifier of the controller corresponding to the third user group from the preset correspondence between a user group and a controller.

In still another possible implementation, the receiving module 1901 is specifically configured to receive the sixth message from the controller corresponding to the third user group or the O&M device.

In still another possible implementation, the external network element includes any one of the following: UE, a base station, or a gateway user plane entity.

In still another possible implementation, the identification information of the UE includes a temporary identifier of the UE and an identifier of the user group to which the UE belongs.

The NES provided in this embodiment of this application may perform any information transmission method performed by the NES in FIG. 3 to FIG. 18. For a specific implementation process and beneficial effects, refer to the foregoing description. Details are not described herein again.

Figure 20:
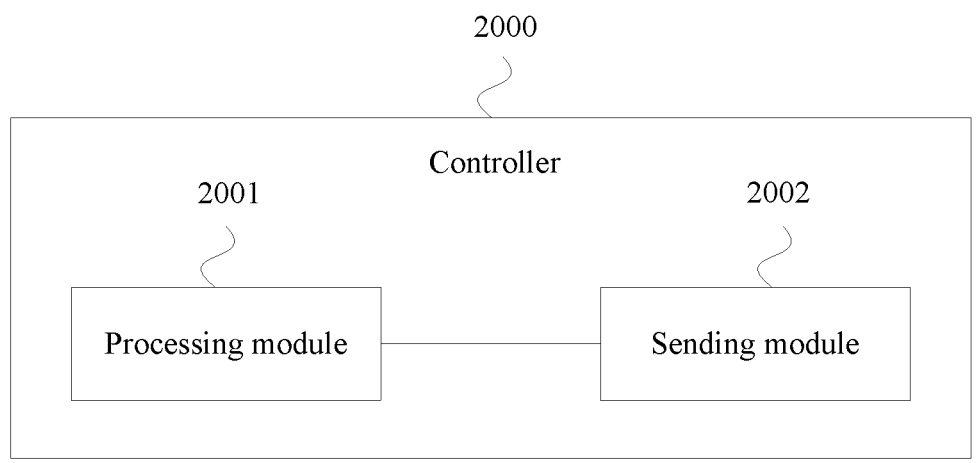
FIG. 20 is a schematic structural diagram of a controller according to an embodiment of this application.

An embodiment of this application further provides a controller. FIG. 20 is a schematic structural diagram of a controller 2000 according to an embodiment of this application. As shown in FIG. 20, the controller 2000 may include:

a processing module 2001, configured to: determine a first user group corresponding to UE, and allocate an identifier to the UE, where the identifier includes an identifier of the first user group and a temporary identifier of the UE; and a sending module 2002, configured to send the identifier to an external network element corresponding to the UE, where the identifier is used to determine a controller that receives a message of the UE.

In a possible implementation, the processing module 2001 is specifically configured to: obtain a first user group list; and select, from the first user group list, a user group as the first user group corresponding to the UE.

In another possible implementation, the controller 2000 further includes:

a receiving module, configured to receive the first user group list from an O&M device.

In still another possible implementation, the controller 2000 further includes:

a receiving module, configured to receive an identifier of a second user group from an O&M device; and the processing module 2001 is specifically configured to add the identifier of the second user group to an existing second user group list, to obtain the first user group list.

In still another possible implementation, the controller 2000 further includes:

a receiving module, configured to receive, from an O&M device, a third user group list migrated from another controller to the controller; and the processing module 2001 is specifically configured to obtain the first user group list based on a user group corresponding to the third user group list and a user group corresponding to an existing fourth user group list, so that the first user group list includes the user group corresponding to the third user group list and the user group corresponding to the fourth user group list.

The controller provided in this embodiment of this application may perform any information transmission method performed by the controller in FIG. 3 to FIG. 18. For a specific implementation process and beneficial effects, refer to the foregoing description. Details are not described herein again.

Figure 21:
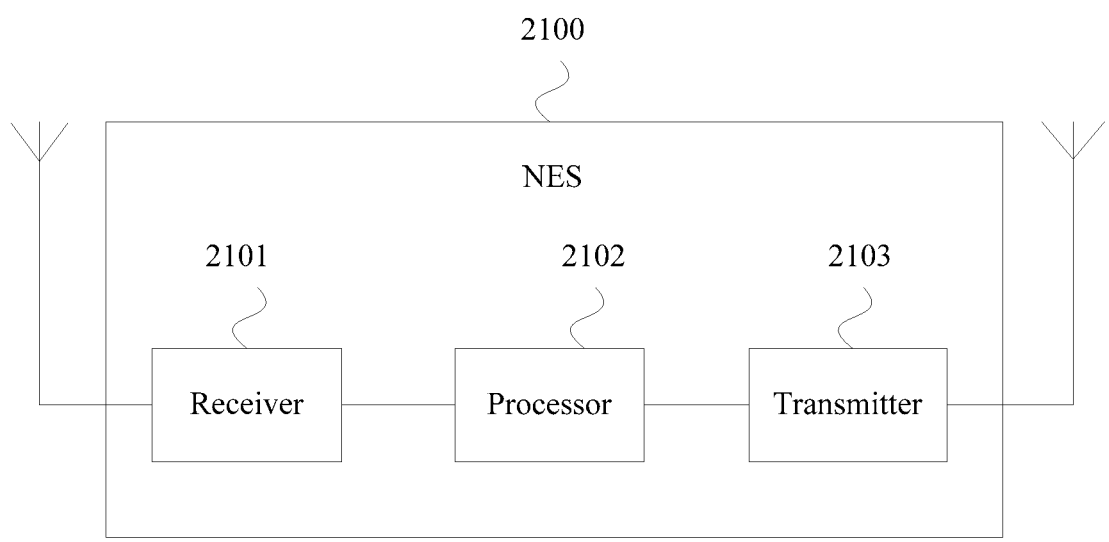
FIG. 21 is a schematic structural diagram of another NES according to an embodiment of this application.

An embodiment of this application further provides an NES. FIG. 21 is a schematic structural diagram of another NES according to an embodiment of this application. As shown in FIG. 21, an NES 2100 may include a receiver 2101, a processor 2102, and a transmitter 2103. The receiver 2101 is connected to the processor 2102, and the processor 2102 is also connected to the transmitter 2103.

The receiver 2101 is configured to receive, from an external network element, a first message including identification information of UE.

The processor 2102 is configured to: determine, based on the identification information of the UE, a first user group to which the UE belongs; and determine a first controller corresponding to the first user group.

The transmitter 2103 is configured to send the first message to the first controller.

In a possible implementation, the processor 2102 is specifically configured to determine, based on the first user group and a preset correspondence between a user group and a controller, the first controller corresponding to the first user group.

In another possible implementation, the receiver 2101 is further configured to receive a second message including an identifier of a second controller and a user group list corresponding to the second controller; and the processor 2102 is further configured to add the identifier of the second controller and the user group list corresponding to the second controller to the preset correspondence between a user group and a controller.

In still another possible implementation, the receiver 2101 is specifically configured to receive the second message from the second controller or an O&M device.

In still another possible implementation, the receiver 2101 is further configured to receive a third message, where the third message includes an identifier of a second user group and an identifier of a controller corresponding to the second user group; and the processor 2102 is further configured to add the identifier of the second user group and the identifier of the controller corresponding to the second user group to the preset correspondence between a user group and a controller.

In still another possible implementation, the receiver 2101 is specifically configured to receive the third message from the controller corresponding to the second user group or the O&M device.

In still another possible implementation, the receiver 2101 is further configured to receive a fourth message, where the fourth message includes an identifier of a third controller and a user group list migrated from a fourth controller to the third controller; and the processor 2102 is further configured to: add, in the preset correspondence between a user group and a controller, the user group list migrated to the third controller to a user group corresponding to the third controller, and delete the user group list migrated to the third controller from a user group corresponding to the fourth controller.

In still another possible implementation, the receiver 2101 is specifically configured to receive the fourth message from the third controller or the O&M device.

In still another possible implementation, the receiver 2101 is further configured to receive a fifth message, where the fifth message includes an identifier of a fifth controller and a user group list corresponding to the fifth controller; and the processor 2102 is further configured to delete the identifier of the fifth controller and the user group list corresponding to the fifth controller from the preset correspondence between a user group and a controller.

In still another possible implementation, the receiver 2101 is specifically configured to receive the fifth message from the fifth controller or the O&M device.

In still another possible implementation, the receiver 2101 is further configured to receive a sixth message, where the sixth message includes an identifier of a third user group and an identifier of a controller corresponding to the third user group; and the processor 2102 is further configured to delete the identifier of the third user group and the identifier of the controller corresponding to the third user group from the preset correspondence between a user group and a controller.

In still another possible implementation, the receiver 2101 is specifically configured to receive the sixth message from the controller corresponding to the third user group or the O&M device.

In still another possible implementation, the external network element includes any one of the following: UE, a base station, or a gateway user plane entity.

In still another possible implementation, the identification information of the UE includes a temporary identifier of the UE and an identifier of the user group to which the UE belongs.

The NES provided in this embodiment of this application may perform any information transmission method performed by the NES in FIG. 3 to FIG. 18. For a specific implementation process and beneficial effects, refer to the foregoing description. Details are not described herein again.

Figure 22:
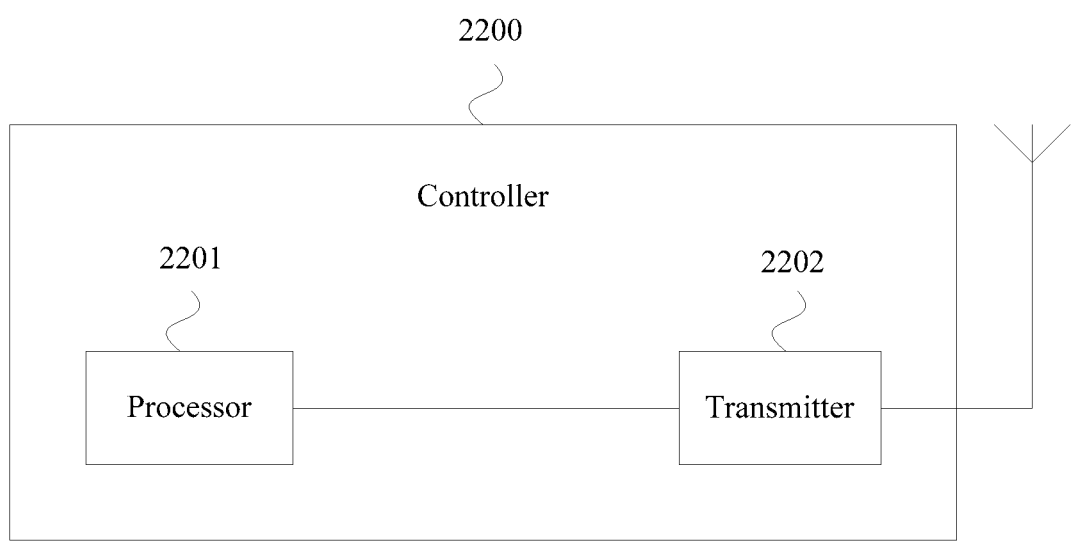
FIG. 22 is a schematic structural diagram of another controller according to an embodiment of this application.

An embodiment of this application further provides a controller. FIG. 22 is a schematic structural diagram of another controller according to an embodiment of this application. As shown in FIG. 22, a controller 2200 may include a processor 2201 and a transmitter 2202. The processor 2201 is connected to the transmitter 2202.

The processor 2201 is configured to: determine a first user group corresponding to UE, and allocate an identifier to the UE, where the identifier includes an identifier of the first user group and a temporary identifier of the UE.

The transmitter 2202 is configured to send the identifier to an external network element corresponding to the UE, where the identifier is used to determine a controller that receives a message of the UE.

In a possible implementation, the processor 2201 is specifically configured to: obtain a first user group list; and select, from the first user group list, a user group as the first user group corresponding to the UE.

In another possible implementation, the controller further includes a receiver, and the receiver is connected to the processor 2201; and the receiver is configured to receive the first user group list from an O&M device.

In still another possible implementation, the controller further includes a receiver, and the receiver is connected to the processor 2201.

The receiver is configured to receive an identifier of a second user group from an O&M device.

The processor 2201 is specifically configured to add the identifier of the second user group to an existing second user group list, to obtain the first user group list.

In still another possible implementation, the controller further includes a receiver, and the receiver is connected to the processor 2201.

The receiver is configured to receive, from an O&M device, a third user group list migrated from another controller to the controller.

The processor 2201 is specifically configured to obtain the first user group list based on a user group corresponding to the third user group list and a user group corresponding to an existing fourth user group list, so that the first user group list includes the user group corresponding to the third user group list and the user group corresponding to the fourth user group list.

The controller provided in this embodiment of this application may perform any information transmission method performed by the controller in FIG. 3 to FIG. 18. For a specific implementation process and beneficial effects, refer to the foregoing description. Details are not described herein again.

A person of ordinary skill in the art may understand that all or some of the steps of the method embodiments may be implemented by a program instructing related hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An information transmission method, comprising:
   receiving, by a network element selector, a first message from a user equipment (UE), wherein the first message comprises identification information of the UE;
   determining, by the network element selector based on the identification information of the UE, a first user group to which the UE belongs;
   determining, by the network element selector based on a correspondence between user groups of UEs and controllers, a first controller corresponding to the first user group, wherein, in the correspondence, each of the controllers corresponds to at least one user group;
   sending, by the network element selector, the first message to the first controller;
   receiving, by the network element selector, a second message, wherein the second message comprises an identifier of a second controller and a user group list including at least one user group migrated from the first controller to the second controller;
   updating, by the network element selector, the correspondence by
      adding, in the correspondence, the user group list migrated to the second controller to a user group corresponding to the second controller, and
      deleting, in the correspondence, the user group list migrated to the second controller from a user group corresponding to the first controller;
   receiving, by the network element selector, a third message from the UE;
   determining, by the network element selector based on the updated correspondence, the second controller; and
   sending, by the network element selector, the third message to the second controller.

2. The method according to claim 1, wherein the method further comprises:
   receiving, by the network element selector, a fourth message, wherein the fourth message comprises an identifier of a third controller and a user group list including at least one user group corresponding to the third controller; and
   adding, by the network element selector, the identifier of the third controller and the user group list corresponding to the third controller to the correspondence.

3. The method according to claim 1, wherein the method further comprises:
   receiving, by the network element selector, a fourth message, wherein the fourth message comprises an identifier of a second user group and an identifier of a controller corresponding to the second user group; and
   adding, by the network element selector, the identifier of the second user group and the identifier of the controller corresponding to the second user group to the correspondence.

4. The method according to claim 1, wherein the method further comprises:
   receiving, by the network element selector, a fourth message, wherein the fourth message comprises an identifier of a third controller and a user group list including at least one user group corresponding to the third controller; and
   deleting, by the network element selector, the identifier of the third controller and the user group list corresponding to the third controller from the correspondence.

5. The method according to claim 1, wherein the method further comprises:
   receiving, by the network element selector, a fourth message, wherein the fourth message comprises an identifier of a second user group and an identifier of a controller corresponding to the second user group; and
   deleting, by the network element selector, the identifier of the second user group and the identifier of the controller corresponding to the second user group from the correspondence.

6. The method according to claim 1, wherein the identification information of the UE comprises a temporary identifier of the UE and an identifier of a user group to which the UE belongs.

7. A network element selector, comprising a receiver, a processor, and a transmitter, wherein
   the receiver is connected to the processor, and the processor is further connected to the transmitter,
   the receiver is configured to receive a first message from a user equipment (UE), wherein the first message comprises identification information of the UE,
   the processor is configured to:
      determine, based on the identification information of the UE, a first user group to which the UE belongs, and
      determine a first controller corresponding to the first user group based on a correspondence between user groups of UEs and controllers, wherein, in the correspondence, each of the controllers corresponds to at least one user group,
   the transmitter is configured to send the first message to the first controller,
   the receiver is further configured to receive a second message, wherein the second message comprises an identifier of a second controller and a user group list including at least one user group migrated from the first controller to the second controller, and
   the processor is further configured to update the correspondence by
      adding, in the correspondence, the user group list migrated to the second controller to a user group corresponding to the second controller, and
      deleting, in the correspondence, the user group list migrated to the second controller from a user group corresponding to the first controller,
   the receiver is further configured to receive a third message from the UE,
   the processor is further configured to determine, based on the updated correspondence, the second controller, and
   the transmitter is further configured to send the third message to the second controller.

8. The network element selector according to claim 7, wherein
   the receiver is further configured to receive a fourth message, wherein the fourth message comprises an identifier of a second user group and an identifier of a controller corresponding to the second user group, and
   the processor is further configured to add the identifier of the second user group and the identifier of the controller corresponding to the second user group to the correspondence.

9. The network element selector according to claim 7, wherein
   the receiver is further configured to receive a fourth message, wherein the fourth message comprises an identifier of a third controller and a user group list including at least one user group corresponding to the third controller, and the processor is further configured to add the identifier of the third controller and the user group list corresponding to the third controller to the correspondence.

10. The network element selector according to claim 7, wherein the receiver is further configured to receive a fourth message, wherein the fourth message comprises an identifier of a third controller and a user group list including at least one user group corresponding to the third controller, and the processor is further configured to delete the identifier of the third controller and the user group list corresponding to the third controller from the correspondence.

11. The network element selector according to claim 7, wherein the receiver is further configured to receive a fourth message, wherein the fourth message comprises an identifier of a second user group and an identifier of a controller corresponding to the second user group, and the processor is further configured to delete the identifier of the second user group and the identifier of the controller corresponding to the second user group from the correspondence.

* * * * *